(12) United States Patent
Zhu et al.

(10) Patent No.: US 11,307,760 B2
(45) Date of Patent: Apr. 19, 2022

(54) TERMINAL INTERFACE DISPLAY METHOD AND TERMINAL

(71) Applicant: HUAWEI TECHNOLOGIES CO., LTD., Guangdong (CN)

(72) Inventors: Jinpeng Zhu, Beijing (CN); Kui Wang, Beijing (CN); Xiang Li, Shenzhen (CN); Zongfang Lin, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/650,264

(22) PCT Filed: Sep. 25, 2017

(86) PCT No.: PCT/CN2017/103288
§ 371 (c)(1),
(2) Date: Mar. 24, 2020

(87) PCT Pub. No.: WO2019/056393
PCT Pub. Date: Mar. 28, 2019

(65) Prior Publication Data
US 2020/0272322 A1 Aug. 27, 2020

(51) Int. Cl.
*G06F 9/451* (2018.01)
*G06F 3/04883* (2022.01)
(Continued)

(52) U.S. Cl.
CPC ........ *G06F 3/04883* (2013.01); *G06F 3/0482* (2013.01); *G06F 3/04817* (2013.01); *G06F 9/451* (2018.02); *G06F 16/252* (2019.01)

(58) Field of Classification Search
CPC combination set(s) only.
See application file for complete search history.

(56) References Cited

U.S. PATENT DOCUMENTS 8,769,431 B1 * 7/2014 Prasad .................... G06F 3/048
715/788
2011/0007009 A1 * 1/2011 Ishihara ............ H04M 1/72469
345/173
(Continued)

FOREIGN PATENT DOCUMENTS

CN 102375652 A 3/2012
CN 102624977 A 8/2012
(Continued)

OTHER PUBLICATIONS

Liu Jia-Sheng et al.,"Left-Right Hand Distinction for Multi-Touch Tabletop Interaction",Journal of Software,dated Mar. 2014,total 31 pages.

*Primary Examiner* — Hien L Duong
(74) *Attorney, Agent, or Firm* — Womble Bond Dickinson (US) LLP

(57) ABSTRACT

This application provides a terminal interface display method and a terminal. A specific solution includes: determining, by a terminal, a frequently used touch area on a first side of the terminal in response to a first gesture input by a user on a first interface, where the first gesture is a gesture input by a finger on a first side of the user, the frequently used touch area is a touch area that is on a terminal interface and that has undergone user operation whose frequency or quantity of times is greater than a first threshold, and the first interface includes at least two application icons; and displaying, by the terminal, at least one frequently used application icon of the at least two application icons in the frequently used touch area on the first side.

9 Claims, 35 Drawing Sheets

(51) Int. Cl.
    *G06F 16/25*             (2019.01)
    *G06F 3/04817*        (2022.01)
    *G06F 3/0482*         (2013.01)

(56) References Cited

U.S. PATENT DOCUMENTS

| | | | |
|---|---|---|---|
| 2012/0317520 A1* | 12/2012 | Lee | G06F 3/04886 715/863 |
| 2014/0028602 A1* | 1/2014 | Morinaga | G06F 3/04886 345/173 |
| 2014/0028604 A1* | 1/2014 | Morinaga | G06K 9/00382 345/173 |
| 2014/0040826 A1* | 2/2014 | Wei | G06F 3/0488 715/810 |
| 2014/0082546 A1* | 3/2014 | Yang | G06F 3/04886 715/773 |
| 2015/0193112 A1 | 7/2015 | Tagaya et al. | |
| 2015/0205507 A1* | 7/2015 | Chen | G06F 3/0488 715/800 |
| 2015/0268743 A1* | 9/2015 | Takeuchi | G06F 1/1632 345/157 |
| 2015/0339044 A1 | 11/2015 | Matsuda | |
| 2016/0062515 A1* | 3/2016 | Bae | G06F 3/044 345/174 |
| 2016/0162149 A1* | 6/2016 | Lee | G06F 3/0412 715/835 |
| 2016/0253039 A1* | 9/2016 | Heo | G06F 3/04186 345/173 |
| 2016/0349856 A1* | 12/2016 | Chi | H04M 1/72569 |
| 2016/0378293 A1* | 12/2016 | Sirpal | G06F 3/0482 715/863 |
| 2017/0017799 A1 | 1/2017 | Fang | |
| 2017/0060391 A1* | 3/2017 | Jun | G06F 3/0488 |
| 2017/0160861 A1* | 6/2017 | Wang | G06F 3/04886 |
| 2017/0212631 A1* | 7/2017 | Kim | G06F 3/04883 |
| 2017/0228125 A1* | 8/2017 | Lee | G06F 3/0488 |
| 2018/0039403 A1* | 2/2018 | Jiang | G06F 3/0488 |
| 2018/0210616 A1* | 7/2018 | Shimada | H04M 1/0281 |
| 2019/0324568 A1 | 10/2019 | Nam | |

FOREIGN PATENT DOCUMENTS

| | | |
|---|---|---|
| CN | 102799268 A | 11/2012 |
| CN | 102799356 A | 11/2012 |
| CN | 102810039 A | 12/2012 |
| CN | 103354581 A | 10/2013 |
| CN | 103365599 A | 10/2013 |
| CN | 103870199 A | 6/2014 |
| CN | 104321736 A | 1/2015 |
| CN | 104932825 A | 9/2015 |
| CN | 106095185 A | 11/2016 |
| CN | 104601795 B | 3/2017 |
| CN | 106527860 A | 3/2017 |
| CN | 106899763 A | 6/2017 |
| CN | 107179875 A | 9/2017 |
| WO | 2014030456 A1 | 2/2014 |
| WO | 2016145832 A1 | 9/2016 |

\* cited by examiner (a) (b)

TERMINAL INTERFACE DISPLAY METHOD AND TERMINAL

CROSS-REFERENCE TO RELATED APPLICATIONS

This application is a National Stage of International Patent Application No. PCT/CN2017/103288, filed on Sep. 25, 2017, which is herein incorporated by reference in its entirety.

TECHNICAL FIELD

This application relates to the field of communications technologies, and in particular, to a terminal interface display method and a terminal.

BACKGROUND

With development of electronic technologies, touchscreen mobile phones have increasingly large touchscreens, and are increasingly popular. However, when a touchscreen of a touchscreen mobile phone is relatively large, a user cannot conveniently operate the touchscreen mobile phone with one hand.

In the following manner, the prior art can resolve a problem that a user cannot conveniently operate a large-screen mobile phone with one hand. Specifically, a sensor may be configured on the touchscreen mobile phone to identify whether the user is currently operating the mobile phone with a left hand or a right hand. Then a display interface of the mobile phone is updated based on an identification result, to facilitate user operation. For example, when it is identified that the user is currently operating the mobile phone with the right hand, application icons in the mobile phone may be displayed on a right side of a touchscreen of the mobile phone.

However, there is the following problem: In the prior art, when it is identified whether the user is operating with the left hand or the right hand, an additional hardware device (such as a sensor) needs to be added into the mobile phone, leading to relatively high costs. Moreover, when the application icons in the mobile phone are displayed on the right side of the touchscreen of the mobile phone, sizes of the application icons or a gap between the application icons are/is definitely reduced, affecting the user's visual and operation experience.

SUMMARY

Embodiments of the application provide a terminal interface display method, so as to enable a user to operate a frequently used application icon more conveniently and comfortably, thereby improving user experience.

According to a first aspect, this application provides a terminal interface display method. The method may include: determining, by a terminal, a frequently used touch area on a first side of the terminal in response to a first gesture input by a user on a first interface, where the first gesture is a gesture input by a finger on a first side of the user, the frequently used touch area is a touch area that is on a terminal interface and that has undergone user operation whose frequency or quantity of times is greater than a first threshold, and the first interface includes at least two application icons; and displaying, by the terminal, at least one frequently used application icon in the frequently used touch area on the first side, where the at least one frequently used application icon is an application icon that is in the at least two application icons and that has undergone user operation whose frequency or quantity of times is greater than a second threshold. When the finger on the first side is a finger of a left hand, the first side of the terminal is a left side of the terminal; or when the finger on the first side of the user is a finger of a right hand, the first side of the terminal is a right side of the terminal.

In one embodiment, when determining that the user operates the terminal with the finger on the first side, the terminal may display the frequently used application icon in the terminal in the frequently used touch area on the first side, so that the user can operate the frequently used application icon more conveniently and comfortably, thereby improving user experience.

In one embodiment, the displaying, by the terminal, at least one frequently used application icon in the frequently used touch area on the first side includes: displaying, by the terminal in the frequently used touch area on the first side, a folder icon including the at least one frequently used application icon.

In one embodiment, the terminal may display, in the frequently used touch area on the first side, a folder icon including all frequently used application icons. In this way, a problem that there are a relatively large quantity of frequently used application icons in the terminal but the frequently used touch area on the first side is insufficient to display all the frequently used application icons can be resolved. In addition, displaying, in the frequently used touch area on the first side, the folder icon including all the frequently used application icons can help the user operate all the frequently used application icons in the terminal.

In one embodiment, after the displaying, by the terminal in the frequently used touch area on the first side, a folder icon including the at least one frequently used application icon, the method of this application further includes: displaying, by the terminal in the frequently used touch area on the first side in response to a user input specific to the folder icon, a folder expanded window corresponding to the folder icon, where the folder expanded window displays the at least one frequently used application icon.

In one embodiment, the terminal may further display, in the frequently used touch area on the first side in response to the user input specific to the folder icon including the frequently used application icons, the folder expanded window corresponding to the folder icon. This can help the user operate all the frequently used application icons in the terminal.

In one embodiment, the determining a frequently used touch area on a first side of the terminal includes: determining, by the terminal, the frequently used touch area of the finger on the first side of the user on the terminal interface based on coordinates of at least one first-side finger sliding track in a first-side track model, where the first-side track model is a left-hand track model or a right-hand track model, the right-hand track model includes coordinates of at least one right-hand sliding track, and the left-hand track model includes coordinates of at least one left-hand sliding track.

In one embodiment, the terminal can determine, based on the coordinates of the at least one first-side finger sliding track in the first-side track model, whether the first gesture is a gesture input by the user with a finger of the left hand or a finger of the right hand (the finger on the first side), and then determine the frequently used touch area of the finger on the first side of the user on the terminal interface. Determining, based on coordinates of a sliding track in a track model, whether the first gesture is a gesture input by the user with a finger of the left hand or a finger of the right hand does not require addition of an extra hardware device. This can reduce costs of determining whether the user operates a mobile phone with the left hand or the right hand.

In one embodiment, the determining, by a terminal, a frequently used touch area on a first side of the terminal in response to a first gesture input by a user on a first interface may include: calculating, by the terminal, a tangent value of an angle between an x-axis or a y-axis of a coordinate axis and a line between a start point and an end point of a sliding track of the first gesture in response to the first gesture input by the user on the first interface; and when the tangent value is in a value interval corresponding to the first side of the terminal, and a preset proportion of points on the sliding track of the first gesture are close to the first side of the terminal, determining, by the terminal, the frequently used touch area on the first side.

In one embodiment, the terminal may determine, by determining a value interval of the tangent value of the angle between the x-axis or the y-axis of the coordinate axis and the line between the start point of the sliding track of the first gesture and the end point of the sliding track of the first gesture, and distribution of points on the sliding track of the first gesture, whether the user operates the mobile phone with the left hand or the right hand. This can avoid a problem of relatively high costs due to addition of an extra hardware device.

In one embodiment, the determining, by a terminal, a frequently used touch area on a first side of the terminal in response to a first gesture input by a user on a first interface includes: determining, by the terminal, coordinates of a start point and an end point of a sliding track of the first gesture in response to the first gesture input by the user on the first interface; searching, by the terminal, for a first sliding track in the left-hand track model and the right-hand track model, where distribution of coordinates of a start point and an end point of the first sliding track on the terminal interface matches the coordinates of the start point and the end point of the sliding track of the first gesture, the left-hand track model includes coordinates of at least one left-hand sliding track, and the right-hand track model includes coordinates of at least one right-hand sliding track; and when finding the first sliding track in the first-side track model, determining, by the terminal, the frequently used touch area on the first side of the terminal, where the first-side track model is the left-hand track model or the right-hand track model.

In one embodiment, that the distribution of the coordinates of the start point and the end point of the first sliding track on the terminal interface matches the coordinates of the start point and the end point of the sliding track of the first gesture specifically means: the coordinates of the start point of the first sliding track are identical to the coordinates of the start point of the sliding track of the first gesture, and the coordinates of the end point of the first sliding track are identical to the coordinates of the end point of the sliding track of the first gesture. Alternatively, the left-hand track model or the right-hand track model includes value ranges of the coordinates of the start point of the first sliding track and value ranges of the coordinates of the end point of the first sliding track. In one embodiment, that the distribution of the coordinates of the start point and the end point of the first sliding track on the terminal interface matches the coordinates of the start point and the end point of the sliding track of the first gesture specifically means: the coordinates of the start point of the first gesture are in the value ranges of the coordinates of the start point of the first sliding track, and the coordinates of the end point of the sliding track of the first gesture are in the value ranges of the coordinates of the end point of the first sliding track.

In one embodiment, before the determining, by a terminal, a frequently used touch area on a first side of the terminal in response to a first gesture input by a user on a first interface, the method of this application further includes: determining, by the terminal in response to a fourth gesture input by the user on the terminal interface, that the fourth gesture is a gesture input by the finger on the first side of the user; and storing coordinates of a sliding track of the fourth gesture in the first-side track model.

In one embodiment, the terminal can collect statistics on coordinates of sliding tracks of a plurality of gestures input by the user (which is equivalent to a gesture habit of the user on a touchscreen of the terminal) without user awareness, and store the coordinates of the sliding tracks in the first-side track model, so that after subsequently receiving the first gesture input by the user, the terminal can compare the coordinates of the sliding tracks in the left-hand track model and the right-hand track model, to determine whether the first gesture is a gesture input by the left hand of the user or a gesture input by the right hand of the user.

In one embodiment, before the determining, by a terminal, a frequently used touch area on a first side of the terminal in response to a first gesture input by a user on a first interface, the method of this application further includes: displaying, by the terminal, a third interface, where the third interface includes first indication information, and the first indication information is used to instruct the user to slide on the terminal interface with the finger on the first side; collecting, by the terminal, statistics on coordinates of sliding tracks of the at least two third gestures in response to at least two third gestures input by the user on the third interface, to obtain coordinates of at least one first-side finger sliding track, where the third gestures are gestures input by the finger on the first side of the user; and storing, by the terminal, the coordinates of the at least one first-side finger sliding track in the first-side track model.

In one embodiment, the terminal may instruct, in a targeted manner, the user to input a gesture with the left hand or input a gesture with the right hand. After the terminal instructs, in a targeted manner, the user to input a left-hand gesture, the terminal can collect coordinates of a sliding track of the left-hand gesture input by the user according to the terminal instruction; or after the terminal instructs, in a targeted manner, the user to input a right-hand gesture, the terminal can collect coordinates of a sliding track of the right-hand gesture input by the user according to the terminal instruction. This can improve accuracy of the coordinates of the sliding tracks stored in the first-side track model.

In one embodiment, to further improve accuracy of coordinates of a sliding track stored in the first-side track model, the terminal may further first determine, in response to a third gesture input by the user on a third interface, whether the third gesture is a gesture input by a finger of the left hand of the user or a gesture input by a finger of the right hand of the user, then confirm with the user whether the terminal performs correct determining, and after the user confirms that the terminal performs correct determining, store coordinates of a corresponding sliding track. Specifically, before the determining, by a terminal, a frequently used touch area on a first side of the terminal in response to a first gesture input by a user on a first interface, the method of this application further includes: displaying, by the terminal, the third interface; determining, by the terminal in response to the third gesture input by the user on the third interface, that the third gesture is a gesture input by the finger on the first side of the user; displaying a fourth interface, where the fourth interface includes indication information used to determine whether the third gesture is a gesture input by the finger on the first side of the user; and storing, by the terminal, coordinates of a sliding track of the third gesture in the first-side track model in response to a first input of the user on the fourth interface, where the first input is used to indicate that the third gesture is a gesture input by the finger on the first side of the user.

one embodiment, the terminal may instruct, in a targeted manner, the user to input a gesture with the left hand or input a gesture with the right hand. In addition, after the user inputs a gesture according to the terminal instruction, the terminal can determine, through a process of performing determining twice, a finger on which side of the user inputs the gesture input by the user. To be specific, the terminal may first determine whether the third gesture is a gesture input by a finger of the left hand of the user or a gesture input by a finger of the right hand of the user, then confirm with the user whether the terminal performs correct determining, and after the user confirms that the terminal performs correct determining, store coordinates of a corresponding sliding track. According to the process of performing determining twice, accuracy of the coordinates of the sliding tracks stored in the first-side track model can be improved.

According to a second aspect, this application provides a terminal interface display method. The method includes: determining, by a terminal, a frequently used touch area on a first side of the terminal in response to a first gesture input by a user on a first interface, where the first gesture is a gesture input by a finger on a first side of the user, and the frequently used touch area is a touch area that is on a terminal interface and that has undergone user operation whose frequency or quantity of times is greater than a first threshold; displaying, by the terminal, a first touch panel in the frequently used touch area on the first side, where the first touch panel is used for operating the first interface in response to a gesture input by the user; and displaying, by the terminal, a second interface in response to a second gesture input by the user on the first touch panel, where the second interface includes an interface element displayed by the terminal in response to a third gesture input by the user in a corresponding position on the first interface, where when the finger on the first side is a finger of a left hand, the first side of the terminal is a left side of the terminal; or when the finger on the first side of the user is a finger of a right hand, the first side of the terminal is a right side of the terminal.

According to the terminal interface display method provided in this application, a gesture input by a user on a touchscreen can be identified, to determine whether the user operates a mobile phone with a left hand or a right hand. This can avoid a problem of relatively high costs due to addition of an extra hardware device. In addition, in this application, when identifying that the user operates the terminal with a finger on the first side (such as the left hand or the right hand), the terminal can display, on the terminal interface, the first touch panel that can be used for operating the terminal interface, so that the user can operate, on the first touch panel, all content on the terminal interface. In this way, the user is able to operate an area that is on the terminal interface and that is not reachable by the finger on the first side, without affecting the user's visual and operation experience. In addition, displaying the first touch panel in the frequently used touch area on the first side can further help the user operate, on the first touch panel, all content on the terminal interface.

It should be noted that for the method of "determining, by a terminal, a frequently used touch area on a first side of the terminal in response to a first gesture input by a user on a first interface" in the second aspect of this application, refer to related descriptions in the foregoing embodiments in the first aspect. Details are not described herein again in this application.

In one embodiment, before the determining, by a terminal, a frequently used touch area on a first side of the terminal in response to a first gesture input by a user on a first interface, the method of this application further includes: determining, by the terminal in response to a fourth gesture input by the user on the terminal interface, that the fourth gesture is a gesture input by the finger on the first side of the user; and storing coordinates of a sliding track of the fourth gesture in the first-side track model. For a specific manner and effect analysis of responding to the fourth gesture and storing the coordinates of the sliding track of the fourth gesture by the terminal, refer to the detailed descriptions in the embodiments in the first aspect. Details are not described herein again in this application.

In one embodiment, the terminal may instruct, in a targeted manner, the user to input a gesture with the left hand or input a gesture with the right hand, and store coordinates of a sliding track of a gesture input by the user. For a specific manner and effect analysis of instructing, by the terminal in a targeted manner, the user to input a gesture with the left hand or input a gesture with the right hand and storing coordinates of a sliding track of a gesture input by the user, refer to the detailed descriptions in the embodiments in the first aspect. Details are not described herein again in this application.

According to a third aspect, this application provides a terminal interface display method. The method includes: determining, by a terminal in response to a first gesture input by a user on a first interface, that the first gesture is a gesture input by a finger on a first side of the user, where the first interface includes a first interface element, and the first interface element includes a navigation bar icon and/or a dock bar icon; and moving, by the terminal, the first interface element to a display area close to a first side of the terminal for display.

In one embodiment, when the terminal determines that the user operates the terminal with the finger on the first side, the terminal can move the navigation bar icon and/or the dock bar icon on the terminal interface to the display area close to the first side of the terminal for display, so that the user can operate the navigation bar icon and/or the dock bar icon more conveniently and comfortably, thereby improving user experience.

According to a fourth aspect, this application provides a terminal. The terminal includes an input unit, a determining unit, and a display unit. The input unit is configured to receive a first gesture input by a user on a first interface, where the first gesture is a gesture input by a finger on a first side of the user. The determining unit is configured to determine a frequently used touch area on a first side of the terminal in response to the first gesture that is input by the user on the first interface and that is received by the input unit, where the frequently used touch area is a touch area that is on a terminal interface and that has undergone user operation whose frequency or quantity of times is greater than a first threshold, and the first interface includes at least two application icons. The display unit is configured to display at least one frequently used application icon in the frequently used touch area on the first side that is determined by the determining unit, where the at least one frequently used application icon is an application icon that is in the at least two application icons and that has undergone user operation whose frequency or quantity of times is greater than a second threshold, where when the finger on the first side is a finger of a left hand, the first side of the terminal is a left side of the terminal; or when the finger on the first side is a finger of a right hand, the first side of the terminal is a right side of the terminal.

In one embodiment, the display unit is specifically configured to display, in the frequently used touch area on the first side, a folder icon including the at least one frequently used application icon.

In one embodiment, the input unit is further configured to receive a user input specific to the folder icon after the display unit displays, in the frequently used touch area on the first side, the folder icon including the at least one frequently used application icon; and the display unit is further configured to display, in the frequently used touch area on the first side in response to the user input specific to the folder icon, a folder expanded window corresponding to the folder icon, where the folder expanded window displays the at least one frequently used application icon.

In one embodiment, the determining unit is specifically configured to determine the frequently used touch area on the first side of the terminal based on coordinates of at least one first-side finger sliding track in a first-side track model, where the first-side track model is a left-hand track model or the right-hand track model, the right-hand track model includes coordinates of at least one right-hand sliding track, and the left-hand track model includes coordinates of at least one left-hand sliding track.

In one embodiment, the determining unit is specifically configured to: calculate a tangent value of an angle between an x-axis or a y-axis of a coordinate axis and a line between a start point and an end point of a sliding track of the first gesture; and when the tangent value is in a value interval corresponding to the first side of the terminal, and a preset proportion of points on the sliding track of the first gesture are close to the first side of the terminal, determine the frequently used touch area on the first side.

In one embodiment, the determining unit is specifically configured to: determine coordinates of a start point and an end point of a sliding track of the first gesture; search for a first sliding track in the left-hand track model and the right-hand track model, where distribution of coordinates of a start point and an end point of the first sliding track on the terminal interface matches the coordinates of the start point and the end point of the sliding track of the first gesture, the left-hand track model includes coordinates of at least one left-hand sliding track, and the right-hand track model includes coordinates of at least one right-hand sliding track; and when finding the first sliding track in the first-side track model, determine the frequently used touch area on the first side of the terminal, where the first-side track model is the left-hand track model or the right-hand track model.

In one embodiment, the display unit is further configured to display a third interface before the determining unit determines the frequently used touch area on the first side of the terminal, where the third interface includes first indication information, and the first indication information is used to instruct the user to slide on the terminal interface with the finger on the first side; and the input unit is further configured to receive at least two third gestures input by the user on the third interface. In this design method, the terminal further includes a statistics collection unit and a storage unit, where the statistics collection unit is configured to collect statistics on coordinates of sliding tracks of the at least two third gestures in response to the at least two third gestures that are input by the user on the third interface and that are received by the input unit, to obtain coordinates of at least one first-side finger sliding track, where the third gestures are gestures input by the finger on the first side of the user; and the storage unit is configured to store the coordinates of the at least one first-side finger sliding track in the first-side track model.

According to a fifth aspect, this application provides a terminal. The terminal includes an input unit, a determining unit, and a display unit. The input unit is configured to receive a first gesture input by a user on a first interface. The determining unit is configured to determine a frequently used touch area on a first side of the terminal in response to the first gesture that is input by the user on the first interface and that is received by the input unit, where the first gesture is a gesture input by a finger on a first side of the user, and the frequently used touch area is a touch area that is on a terminal interface and that has undergone user operation whose frequency or quantity of times is greater than a first threshold. The display unit is further configured to display a first touch panel in the frequently used touch area on the first side that is displayed by the display unit, where the first touch panel is used for operating the first interface in response to a gesture input by the user. The input unit is further configured to receive a second gesture input by the user on the first touch panel displayed by the display unit. The display unit is further configured to display a second interface in response to the second gesture that is input by the user on the first touch panel and that is received by the input unit, where the second interface includes an interface element displayed by the terminal in response to a third gesture input by the user in a corresponding position on the first interface, where when the finger on the first side is a finger of a left hand, the first side of the terminal is a left side of the terminal; or when the finger on the first side is a finger of a right hand, the first side of the terminal is a right side of the terminal.

It should be noted that for the method of "determining, by a determining unit, a frequently used touch area on a first side of the terminal" in the fifth aspect of this application, refer to related descriptions about the determining unit in the embodiments in the fourth aspect. Details are not described herein again in this application.

In one embodiment, the input unit is further configured to: before the determining unit determines the frequently used touch area on the first side of the terminal, receive a fourth gesture input by the user on the terminal interface; the determining unit is further configured to determine, in response to the fourth gesture that is input by the user on the terminal interface, that the fourth gesture is a gesture input by the finger on the first side of the user; and a storage unit is configured to store coordinates of a sliding track of the fourth gesture in a first-side track model.

According to a sixth aspect, this application provides a terminal. The terminal includes an input unit, a determining unit, and a display unit. The input unit is configured to receive a first gesture input by a user on a first interface. The determining unit is configured to determine, in response to the first gesture input by the user on the first interface, that the first gesture is a gesture input by a finger on a first side of the user, where the first interface includes a first interface element, and the first interface element includes a navigation bar icon and/or a dock bar icon. The display unit is configured to move the first interface element to a display area close to a first side of the terminal for display.

According to a seventh aspect, this application provides a terminal. The terminal includes a processor, a memory, and a touchscreen, where the memory and the touchscreen are coupled to the processor, the memory is configured to store computer program code, the computer program code includes a computer instruction, and when the processor executes the computer instruction, the terminal performs the following operations: the touchscreen is configured to display a first interface, where the first interface includes at least two application icons; the processor is configured to determine a frequently used touch area on a first side of the terminal in response to a first gesture input by a user on the first interface displayed on the touchscreen, where the first gesture is a gesture input by a finger on a first side of the user, and the frequently used touch area is a touch area that is on a terminal interface and that has undergone user operation whose frequency or quantity of times is greater than a first threshold; and the touchscreen is further configured to display at least one frequently used application icon in the frequently used touch area on the first side that is determined by the processor, where the at least one frequently used application icon is an application icon that is in the at least two application icons and that has undergone user operation whose frequency or quantity of times is greater than a second threshold, where when the finger on the first side is a finger of a left hand, the first side of the terminal is a left side of the terminal; or when the finger on the first side is a finger of a right hand, the first side of the terminal is a right side of the terminal.

In one embodiment, the touchscreen is specifically configured to display, in the frequently used touch area on the first side, a folder icon including the at least one frequently used application icon.

In one embodiment, the processor is further configured to: after the folder icon including the at least one frequently used application icon is displayed in the frequently used touch area on the first side, receive a user input specific to the folder icon displayed by the touchscreen; and the touchscreen is further configured to display, in the frequently used touch area on the first side in response to the user input specific to the folder icon, a folder expanded window corresponding to the folder icon, where the folder expanded window displays the at least one frequently used application icon.

In one embodiment, the processor is specifically configured to determine the frequently used touch area on the first side of the terminal based on coordinates of at least one first-side finger sliding track in a first-side track model, where the first-side track model is a left-hand track model or the right-hand track model, the right-hand track model includes coordinates of at least one right-hand sliding track, and the left-hand track model includes coordinates of at least one left-hand sliding track.

According to an eighth aspect, this application provides a terminal. The terminal includes a processor, a memory, and a touchscreen, where the memory and the touchscreen are coupled to the processor, the memory is configured to store computer program code, the computer program code includes a computer instruction, and when the processor executes the computer instruction, the terminal performs the following operations: the touchscreen is configured to display a first interface; the processor is configured to determine a frequently used touch area on a first side of the terminal in response to a first gesture input by a user on the first interface displayed on the touchscreen, where the first gesture is a gesture input by a finger on a first side of the user, and the frequently used touch area is a touch area that is on a terminal interface and that has undergone user operation whose frequency or quantity of times is greater than a first threshold; the touchscreen is further configured to display a first touch panel in the frequently used touch area on the first side that is determined by the processor, where the first touch panel is used for operating the first interface in response to a gesture input by the user; the processor is further configured to receive a second gesture input by the user on the first touch panel displayed by the touchscreen; and the touchscreen is further configured to display a second interface in response to the second gesture input by the user on the first touch panel, where the second interface includes an interface element displayed by the terminal in response to a third gesture input by the user in a corresponding position on the first interface, where when the finger on the first side is a finger of a left hand, the first side of the terminal is a left side of the terminal; or when the finger on the first side is a finger of a right hand, the first side of the terminal is a right side of the terminal.

In one embodiment, the processor is specifically configured to determine the frequently used touch area on the first side of the terminal based on coordinates of at least one first-side finger sliding track in a first-side track model, where the first-side track model is a left-hand track model or the right-hand track model, the right-hand track model includes coordinates of at least one right-hand sliding track, and the left-hand track model includes coordinates of at least one left-hand sliding track.

In one embodiment, the processor is specifically configured to: calculate a tangent value of an angle between an x-axis or a y-axis of a coordinate axis and a line between a start point and an end point of a sliding track of the first gesture; and when the tangent value is in a value interval corresponding to the first side of the terminal, and a preset proportion of points on the sliding track of the first gesture are close to the first side of the terminal, determine the frequently used touch area on the first side.

In one embodiment, the processor is specifically configured to: determine coordinates of a start point and an end point of a sliding track of the first gesture; search for a first sliding track in the left-hand track model and the right-hand track model, where distribution of coordinates of a start point and an end point of the first sliding track on the terminal interface matches the coordinates of the start point and the end point of the sliding track of the first gesture, the left-hand track model includes coordinates of at least one left-hand sliding track, and the right-hand track model includes coordinates of at least one right-hand sliding track; and when finding the first sliding track in the first-side track model, determine the frequently used touch area on the first side of the terminal, where the first-side track model is the left-hand track model or the right-hand track model.

In one embodiment, the touchscreen is further configured to display a third interface before the processor determines the frequently used touch area on the first side of the terminal, where the third interface includes first indication information, and the first indication information is used to instruct the user to slide on the terminal interface with the finger on the first side; the processor is further configured to receive at least two third gestures input by the user on the third interface displayed by the touchscreen, and collect statistics on coordinates of sliding tracks of the at least two third gestures in response to the at least two third gestures input by the user on the third interface, to obtain coordinates of at least one first-side finger sliding track, where the third gesture is a gesture input by the finger on the first side of the user; and the memory is further configured to store the coordinates of the at least one first-side finger sliding track in the first-side track model.

In one embodiment, the processor is further configured to: before determining, in response to the first gesture input by the user on the first interface, whether the first gesture is a gesture input by a left hand of the user or a gesture input by a right hand of the user, determine, in response to a fourth gesture input by the user on the terminal interface, that the fourth gesture is a gesture input by the finger on the first side of the user; and the memory is further configured to store coordinates of a sliding track of the fourth gesture in the first-side track model.

According to a ninth aspect, this application provides a terminal. The terminal includes a processor, a memory, and a touchscreen, where the memory and the touchscreen are coupled to the processor, the memory is configured to store computer program code, the computer program code includes a computer instruction, and when the processor executes the computer instruction, the terminal performs the following operations: the processor is configured to receive a first gesture input by a user on a first interface; determine, in response to the first gesture input by the user on the first interface, that the first gesture is a gesture input by a finger on a first side of the user, where the first interface includes a first interface element, and the first interface element includes a navigation bar icon and/or a dock bar icon; and the touchscreen is configured to move the first interface element to a display area close to a first side of the terminal for display.

According to a tenth aspect, this application provides a graphical user interface (Graphical User Interface, GUI). The graphical user interface is stored in a terminal, the terminal includes a touchscreen, a memory, and a processor, the processor is configured to execute one or more computer programs stored in the memory, and the graphical user interface includes: a first GUI displayed on the touchscreen, where the first GUI includes at least two application icons; and a second GUI displayed in response to a first gesture input on the first GUI, where a frequently used touch area on a first side of the second GUI includes at least one frequently used application icon, the first gesture is a gesture input by a finger on a first side of a user, the frequently used touch area is a touch area that is on the second GUI and that has undergone user operation whose frequency or quantity of times is greater than a first threshold, and the at least one frequently used application icon is an application icon that is in the at least two application icons and that has undergone user operation whose frequency or quantity of times is greater than a second threshold.

In one embodiment, the second GUI includes a folder icon, and the folder icon includes the at least one frequently used application icon.

In one embodiment, the GUI further includes a third GUI displayed in response to an input specific to the folder icon on the second GUI, where the third GUI includes a folder expanded window corresponding to the folder icon, and the folder expanded window displays the at least one frequently used application icon.

According to an eleventh aspect, this application provides a graphical user interface (GUI). The graphical user interface is stored in a terminal, the terminal includes a touchscreen, a memory, and a processor, the processor is configured to execute one or more computer programs stored in the memory, and the graphical user interface includes: a first GUI displayed on the touchscreen; a second GUI displayed in response to a first gesture input on the first GUI, where a frequently used touch area on a first side of the second GUI includes a first touch panel, the first touch panel is used for operating the first GUI in response to a gesture input by the user, the first gesture is a gesture input by a finger on a first side of the user, and the frequently used touch area is a touch area that is on the second GUI and that has undergone user operation whose frequency or quantity of times is greater than a first threshold; and a third GUI displayed in response to a second gesture input on the first touch panel on the second GUI, where the third GUI includes an interface element displayed by the terminal in response to a third gesture input by the user in a corresponding position on the first GUI.

In one embodiment, the GUI further includes a fourth GUI displayed on the touchscreen, where the fourth GUI includes first indication information, and the first indication information is used to instruct the user to slide on the fourth GUI with the finger on the first side.

According to a twelfth aspect, this application provides a graphical user interface (GUI). The graphical user interface is stored in a terminal, the terminal includes a touchscreen, a memory, and a processor, the processor is configured to execute one or more computer programs stored in the memory, and the graphical user interface includes: a first GUI displayed on the touchscreen, where the first GUI includes a first interface element, and the first interface element includes a navigation bar icon and/or a dock bar icon; and a second GUI displayed in response to a first gesture input on the first GUI, where a display area on a first side of the second GUI includes the first interface element.

According to a thirteenth aspect, this application provides a computer storage medium. The computer storage medium includes a computer instruction, and when the computer instruction is run on a terminal, the terminal is enabled to perform the terminal interface display methods described in the first aspect, the second aspect, and the third aspect of this application, and any embodiment of the first aspect, the second aspect, and the third aspect of this application.

According to a fourteenth aspect, this application provides a computer program product. When the computer program product is run on a computer, the computer is enabled to implement the terminal interface display methods described in the first aspect, the second aspect, and the third aspect of this application, and any embodiment of the first aspect, the second aspect, and the third aspect of this application.

It may be understood that the terminals described in the fourth aspect to the ninth aspect and the embodiments of the fourth aspect to the ninth aspect, the GUIs described in the tenth aspect to the twelfth aspect, the computer storage medium described in the thirteenth aspect, and the computer program product described in the fourteenth aspect are all configured to perform the corresponding methods provided in the foregoing. Therefore, for beneficial effects achieved by the terminals, the GUIs, the computer storage medium, and the computer program product, refer to the beneficial effects of the corresponding methods provided in the foregoing. Details are not described herein again.

DESCRIPTION OF EMBODIMENTS

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of this application, unless otherwise stated, "plurality" means at least two.

When a user uses a touchscreen mobile phone, the user cannot conveniently operate the touchscreen mobile phone with one hand if a touchscreen of the touchscreen mobile phone is relatively large. For example, as shown in (a) in FIG. 1, when the user holds a mobile phone 100 with a left hand, the left hand of the user cannot reach or operate an application icon, such as a "CMB" icon 01, displayed in the upper right of a touchscreen of the mobile phone 100. As shown in (b) in FIG. 1, when the user holds the mobile phone 100 with a right hand, the right hand of the user cannot reach or operate an application icon, such as a "Photos" icon 02, displayed in the upper left of the touchscreen of the mobile phone 100.

According to a terminal interface display method and a terminal provided in this application, a gesture input by the user on a touchscreen can be identified, to determine whether the user operates a mobile phone with a left hand or a right hand. This can avoid a problem of relatively high costs due to addition of an extra hardware device. In addition, in this application, when identifying that the user operates the terminal with a finger on a first side (such as the left hand or the right hand), the terminal can display, close to a first side of the terminal, a touch area that can be used for operating a terminal interface, so that the user can operate, on the touch area, all content on the terminal interface. In this way, the user is able to operate an area that is on the terminal interface and that is not reachable by the finger on the first side, without affecting the user's visual and operation experience. For example, the user can operate, in the touch area, the "Photos" icon 02 that is not reachable by the right hand of the user, as shown in (b) in FIG. 1.

Figure 1:
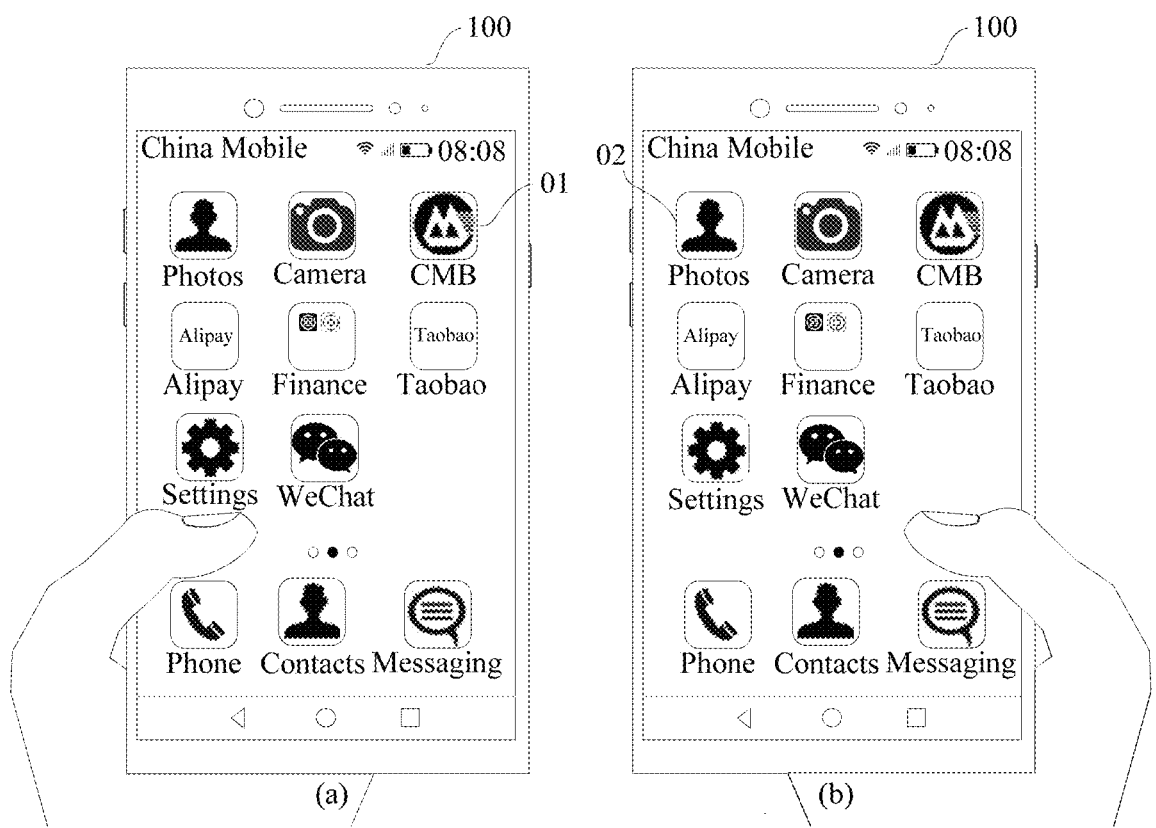
FIG. 1 is an example schematic diagram 1 of a terminal interface of a mobile phone according to this application.
Figure 2:
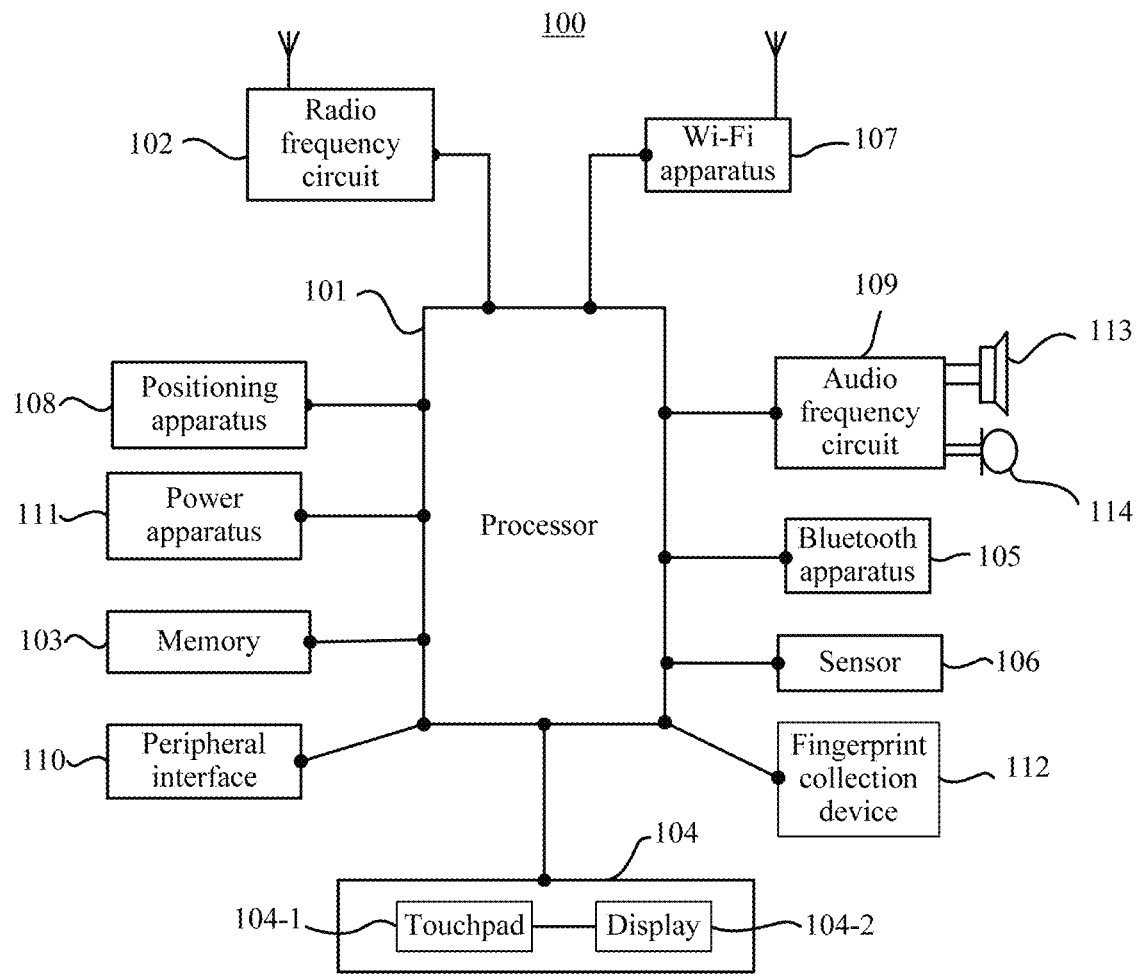
FIG. 2 is a schematic diagram of a hardware structure of a mobile phone according to this application.

The terminal interface display method provided in this application may be performed by a terminal interface display apparatus, where the terminal interface display apparatus may be the mobile phone 100 shown in FIG. 1 or FIG. 2. In addition, the terminal interface display apparatus may alternatively be a central processing unit (English: Central Processing Unit, CPU for short) in the terminal, or a control module that is in the terminal and that is configured to perform the terminal interface display method. In embodiments of the present invention, the terminal interface display method provided in the embodiments of the present invention is described by using an example in which the terminal performs the terminal interface display method.

For example, the terminal in this application may be a mobile phone (such as the mobile phone 100 shown in FIG. 2), a tablet computer, a personal computer (Personal Computer, PC), a personal digital assistant (personal digital assistant, PDA), a smartwatch, a netbook, a wearable electronic device, or the like, that may be installed with an application and displays an application icon. A specific form of the device is not specially limited in this application.

As shown in FIG. 2, with the mobile phone 100 as an example of the terminal, the mobile phone 100 may specifically include components such as a processor 101, a radio frequency (Radio Frequency, RF) circuit 102, a memory 103, a touchscreen 104, a Bluetooth apparatus 105, one or more sensors 106, a wireless fidelity (Wireless Fidelity, WiFi) apparatus 107, a positioning apparatus 108, an audio frequency circuit 109, a peripheral interface 110, and a power apparatus 111. These components may communicate by using one or more communications buses or signal lines (not shown in FIG. 2). A person skilled in the art may understand that a hardware structure shown in FIG. 2 does not constitute any limitation on the mobile phone, and the mobile phone 100 may include more or fewer components than those shown in the figure, or a combination of some components, or components disposed in a different manner.

The following specifically describes the components of the mobile phone 100 with reference to FIG. 2.

The processor 101 is a control center of the mobile phone 100, and is connected to various parts of the mobile phone 100 by using various interfaces and lines. The processor 101 runs or executes an application stored in the memory 103 and invokes data stored in the memory 103, to perform various functions of the mobile phone 100 and process data. In some embodiments, the processor 101 may include one or more processing units. For example, the processor 101 may be a Kirin 960 chip manufactured by Huawei Technologies Co., Ltd. In some embodiments of this application, the processor 101 may further include a fingerprint verification chip, configured to verify a collected fingerprint.

The radio frequency circuit 102 may be configured to receive and send a radio signal in an information receiving and sending process or a call process. Particularly, the radio frequency circuit 102 may receive downlink data from a base station and then send the downlink data to the processor 101 for processing, and also send related uplink data to the base station. Usually, the radio frequency circuit includes but is not limited to an antenna, at least one amplifier, a transceiver, a coupler, a low noise amplifier, a duplexer, and the like. In addition, the radio frequency circuit 102 may further communicate with another device through radio communication. The radio communication may use any communication standard or protocol, including but not limited to a global system for mobile communications, a general packet radio service, code division multiple access, wideband code division multiple access, long term evolution, an email, a short message service, or the like.

The memory 103 is configured to store an application and data. The processor 101 performs various functions of the mobile phone 100 and data processing by running the application and the data that are stored in the memory 103. The memory 103 mainly includes a program storage area and a data storage area. The program storage area may store an operating system, an application required by at least one function (such as a voice playback function and an image playback function). The data storage area may store data (such as audio data and a phone book) that is created based on use of the mobile phone 100. In addition, the memory 103 may include a high-speed random access memory (Random Access Memory, RAM), and may further include a nonvolatile memory such as a magnetic disk storage device or a flash memory device, another volatile solid-state storage device, or the like. The memory 103 may store various operating systems such as an iOS® operating system developed by Apple Inc. and an Android® operating system developed by Google Inc. The memory 103 may be independent and is connected to the processor 101 by using the communications bus. The memory 103 may alternatively be integrated with the processor 101.

The touchscreen 104 may specifically include a touchpad 104-1 and a display 104-2.

The touchpad 104-1 may collect a touch event performed by a user of the mobile phone 100 on or near the touchpad 104-1 (for example, an operation performed by the user by using any suitable object, such as a finger or a stylus, on or near the touchpad 104-1), and send collected touch information to another device (such as the processor 101). The touch event performed by the user near the touchpad 104-1 may be referred to as a floating touch. The floating touch may mean that the user does not need to directly touch a touchpad to select, move, or drag a target (for example, an icon), and the user only needs to be near a device to perform a desired function. In addition, the touchpad 104-1 may be implemented in a plurality of types, such as a resistive type, a capacitive type, an infrared type, and a surface acoustic wave type.

The display (also referred to as a display screen) 104-2 may be configured to display information input by the user or information provided for the user, and various menus of the mobile phone 100. The display 104-2 may be configured in a form of a liquid crystal display, an organic light-emitting diode, or the like. The touchpad 104-1 may cover the display 104-2. After detecting a touch event on or near the touchpad 104-1, the touchpad 104-1 transmits information about the touch event to the processor 101 to determine a touch event type. Then, the processor 101 may provide corresponding visual output on the display 104-2 based on the touch event type. In FIG. 2, the touchpad 104-1 and the display screen 104-2 act as two independent components to respectively implement input and output functions of the mobile phone 100. However, in some embodiments, the touchpad 104-1 and the display screen 104-2 may be integrated to implement the input and output functions of the mobile phone 100. It can be understood that the touchscreen 104 is formed by stacking a plurality of layers of materials. In the embodiments of this application, only the touchpad (layer) and the display screen (layer) are shown, and other layers are not described in the embodiments of this application. In addition, the touchpad 104-1 may be disposed in a full-panel form on a front side of the mobile phone 100, and the display screen 104-2 may also be disposed in the full-panel form on the front side of the mobile phone 100, thereby implementing a frameless structure on the front side of the mobile phone.

In addition, the mobile phone 100 may further have a fingerprint recognition function. For example, a fingerprint recognizer 112 may be disposed on a rear side of the mobile phone 100 (for example, below a rear-facing camera), or the fingerprint recognizer 112 may be disposed on the front side of the mobile phone 100 (for example, below the touchscreen 104). For another example, a fingerprint collection device 112 may be disposed in the touchscreen 104, to implement the fingerprint recognition function, that is, the fingerprint collection device 112 may be integrated into the touchscreen 104 to implement the fingerprint recognition function of the mobile phone 100. In this case, the fingerprint collection device 112 is disposed in the touchscreen 104 as part of the touchscreen 104 or may be disposed in the touchscreen 104 in another manner. A main component of the fingerprint collection device 112 in this embodiment of this application is a fingerprint sensor. The fingerprint sensor may use any type of sensing technology, including but not limited to an optical sensing technology, a capacitive sensing technology, a piezoelectric sensing technology, an ultrasonic sensing technology, or the like.

The mobile phone 100 may further include a Bluetooth apparatus 105, configured to implement data exchange between the mobile phone 100 and another device (for example, a mobile phone or a smartwatch) at a short distance. The Bluetooth apparatus in this embodiment of this application may be an integrated circuit, a Bluetooth chip, or the like.

The mobile phone 100 may further include at least one sensor 106, for example, a light sensor, a motion sensor, and another sensor. Specifically, the light sensor may include an ambient light sensor and a proximity sensor. The ambient light sensor may adjust luminance of the display of the touchscreen 104 based on brightness of ambient light. The proximity sensor may turn off the display when the mobile phone 100 is moved close to an ear. As a type of motion sensor, an accelerometer sensor may detect acceleration magnitudes in all directions (usually three axes) of the mobile phone, may detect a magnitude and a direction of gravity when the mobile phone is in a static state, and may be applied to an application recognizing a mobile phone posture (such as screen switching between a portrait mode and a landscape mode, a related game, or magnetometer posture calibration), a function related to vibration recognition (such as a pedometer or a knock), and the like. For another sensor that may also be configured in the mobile phone 100, such as a gyroscope, a barometer, a hygrometer, a thermometer, or an infrared sensor, details are not described herein.

The Wi-Fi apparatus 107 is configured to provide the mobile phone 100 with network access conforming to a Wi-Fi related standard or protocol. The mobile phone 100 may access a Wi-Fi access point by using the Wi-Fi apparatus 107, so as to help the user receive and send emails, browse a web page, access streaming media, and the like. The Wi-Fi apparatus 107 provides wireless broadband Internet access for the user. In some other embodiments, the Wi-Fi apparatus 107 may alternatively be used as a Wi-Fi wireless access point, to provide Wi-Fi network access for another device.

The positioning apparatus 108 is configured to provide a geographical location for the mobile phone 100. It can be understood that the positioning apparatus 108 may be specifically a receiver of a positioning system such as the global positioning system (Global Positioning System, GPS), the Beidou satellite navigation system, or the GLONASS of Russia. After receiving a geographical location sent by the positioning system, the positioning apparatus 108 sends the information to the processor 101 for processing, or sends the information to the memory 103 for storage. In some other embodiments, the positioning apparatus 108 may alternatively be a receiver of an assisted global positioning system (Assisted Global Positioning System, AGPS). The AGPS, acting as an assistance server, assists the positioning apparatus 108 in completing ranging and positioning services. In this case, the positioning assistance server communicates with the positioning apparatus 108 (that is, a GPS receiver) of the device such as the mobile phone 100 by using a wireless communications network, to provide positioning assistance. In some other embodiments, the positioning apparatus 108 may alternatively use a positioning technology that is based on a Wi-Fi access point. Each Wi-Fi access point has a globally unique (Media Access Control, MAC) address. When Wi-Fi is enabled on the device, the device can perform scanning and collect broadcast signals from surrounding Wi-Fi access points, so as to obtain MAC addresses that are broadcast by the Wi-Fi access points. The device sends, to a location server by using a wireless communications network, data (for example, the MAC addresses) that can indicate the Wi-Fi access points. The location server retrieves geographical locations of all the Wi-Fi access points, calculates a geographical location of the device based on strength of Wi-Fi broadcast signals, and sends the geographical location to the positioning apparatus 108 of the device.

The audio frequency circuit 109, a loudspeaker 113, and a microphone 114 may provide an audio interface between the user and the mobile phone 100. The audio frequency circuit 109 may transmit, to the loudspeaker 113, an electrical signal converted from received audio data, and the loudspeaker 113 converts the electrical signal into a sound signal for output. In addition, the microphone 114 converts a collected sound signal into an electrical signal, and the audio frequency circuit 109 receives the electrical signal, converts the electrical signal into audio data, and then outputs the audio data to the RF circuit 102, to send the audio data to, for example, another mobile phone, or outputs the audio data to the memory 103 for further processing.

The peripheral interface 110 is configured to provide various interfaces for external input/output devices (for example, a keyboard, a mouse, an external display, an external memory, and a subscriber identity module card). For example, the peripheral interface 110 is connected to a mouse by using a universal serial bus (Universal Serial Bus, USB) interface, and is connected, by using a metal contact on a card slot of a subscriber identity module card, to the subscriber identity module (Subscriber Identity Module, SIM) card provided by a telecommunications operator. The peripheral interface 110 may be configured to couple the foregoing external input/output peripheral devices to the processor 101 and the memory 103.

In this embodiment of the present invention, the mobile phone 100 may communicate with another device in a device group by using the peripheral interface 110. For example, the mobile phone 100 may receive, by using the peripheral interface 110, display data sent by another device, for display. This is not limited in this embodiment of the present invention.

The mobile phone 100 may further include the power apparatus 111 (for example, a battery and a power management chip) that supplies power to all the components. The battery may be logically connected to the processor 101 by using the power management chip, so as to implement functions such as charging and discharging management and power consumption management by using the power apparatus 111.

Although not shown in FIG. 2, the mobile phone 100 may further include a camera (a front-facing camera and/or a rear-facing camera), a camera flash, a micro projection apparatus, a near field communication (Near Field Communication, NFC) apparatus, and the like. Details are not described herein again.

All methods in the following embodiments may be implemented in the mobile phone 100 having the foregoing hardware structure.

This application provides a terminal interface display method. The terminal interface display method includes S301 to S303.

S301: A terminal determines a frequently used touch area on a first side of the terminal in response to a first gesture input by a user on a first interface.

A finger on a first side of the user is a finger of a left hand or a right hand of the user.

Figure 3:
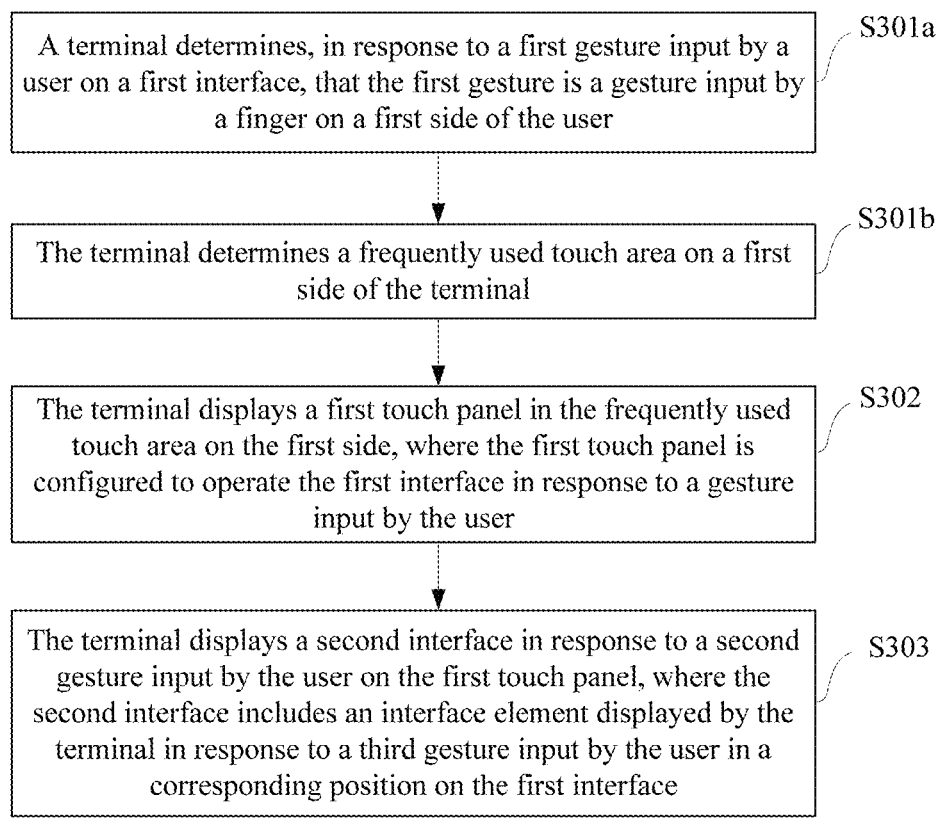
FIG. 3 is a flowchart 1 of a terminal interface display method according to this application.

In one embodiment, the terminal can first determine, in response to the first gesture input by the user on the first interface, whether the first gesture is a gesture input by the left hand of the user or a gesture input by the right hand of the user. When the terminal determines that the first gesture is a gesture input by the left hand of the user, the terminal determines a frequently used touch area on a left side of the terminal; or when the terminal determines that the first gesture is a gesture input by the right hand of the user, the terminal determines a frequently used touch area on a right side of the terminal. Specifically, S301 may be replaced by S301a and S301b. As shown in FIG. 3, the terminal interface display method includes S301a, S301b, S302, and S303.

S301a: A terminal determines, in response to a first gesture input by a user on a first interface, that the first gesture is a gesture input by a finger on a first side of the user.

Figure 4:
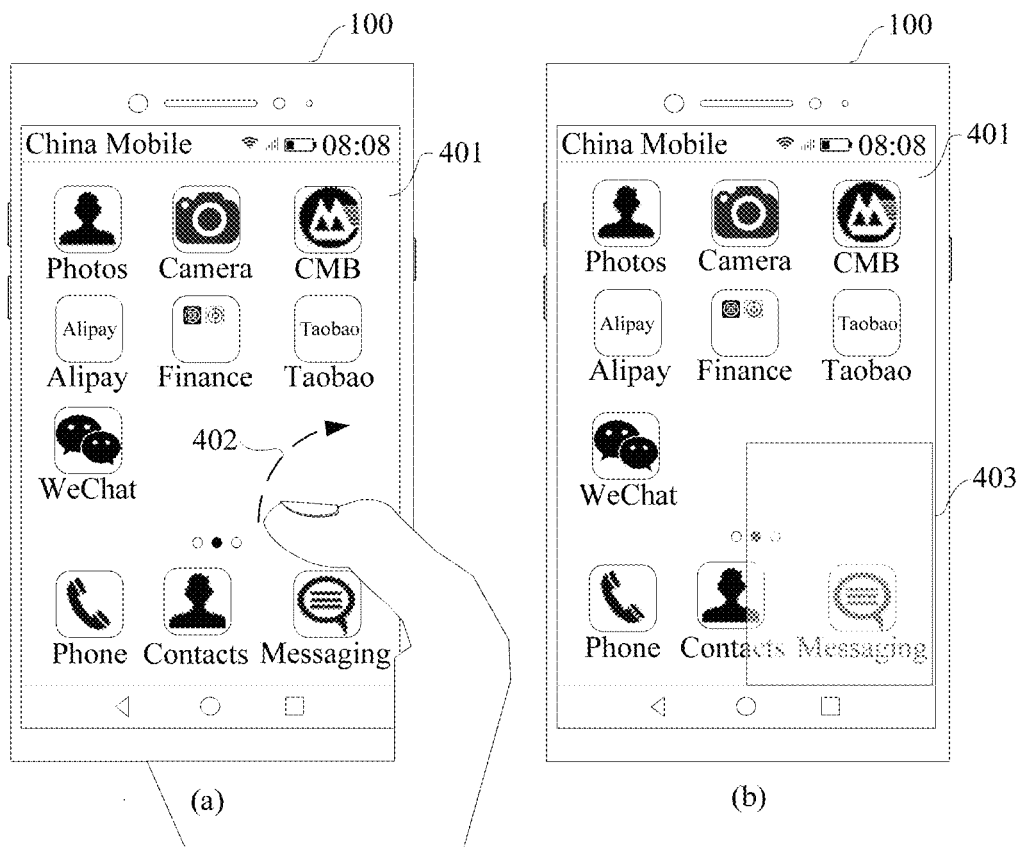
FIG. 4 is an example schematic diagram 2 of a terminal interface of a mobile phone according to this application.

For example, assuming that the terminal is the mobile phone 100, the mobile phone 100 may display a first interface 401 shown in (a) in FIG. 4. Certainly, the first interface displayed by the terminal in this application includes but is not limited to a display desktop 401 that includes application icons and that is shown in (a) in FIG. 4. For example, the first interface may alternatively be any display interface of any application in the terminal.

The first gesture may be a sliding track input by the terminal in any area on the first interface. For example, as shown in (a) in FIG. 4, a sliding track 402 input by the user on the first interface 401 may be a sliding track corresponding to the first gesture.

In an implementation, the terminal may calculate a tangent value of an angle between an x-axis or a y-axis of a coordinate axis and a line between a start point and an end point of the sliding track of the first gesture, and determine, based on a value range of the tangent value and a distribution status of points on the sliding track of the first gesture on a terminal interface, whether the first gesture is a gesture input by a left hand of the user or a gesture input by a right hand of the user.

In another implementation, the terminal may determine coordinates of the start point and the end point of the sliding track of the first gesture, and search, in a prestored left-hand track model and a prestored right-hand track model, for a first sliding track, where distribution of coordinates of a start point and an end point of the first sliding track on the terminal interface matches the coordinates of the start point and the end point of the sliding track of the first gesture. If the terminal finds the first sliding track in a first-side track model (such as the left-hand track model), the terminal can determine that the first gesture is a gesture input by the finger on the first side (for example, the left hand) of the user.

S301b: The terminal determines a frequently used touch area on a first side of the terminal.

The frequently used touch area is a touch area that is on the terminal interface and that has undergone user operation whose frequency or quantity of times is greater than a first threshold. The frequently used touch area on the first side may be a frequently used touch area on a left side of the terminal or a frequently used touch area on a right side of the terminal.

For example, the terminal can obtain sliding tracks of a left-hand gesture (that is, a gesture input by a finger of the left hand) and a right-hand gesture (that is, a gesture input by a finger of the right hand) that are input by the user on the terminal interface, collect statistics on a distribution status of points (left-side track points for short) on the sliding track of the left-hand gesture on the terminal interface, and determine an area that is on the terminal interface and in which a relatively large quantity of left-side track points are distributed, as the frequently used touch area on the left side. The terminal can also collect statistics on a distribution status of points (right-side track points for short) on the sliding track of the right-hand gesture on the terminal interface, and determine an area that is on the terminal interface and in which a relatively large quantity of right-side track points are distributed, as the frequently used touch area on the right side. An area in which a relatively large quantity of track points are distributed is an area that is on the terminal interface and in which a density degree of track points is higher than a threshold.

S302: The terminal displays a first touch panel in the frequently used touch area on the first side, where the first touch panel is used for operating the first interface in response to a gesture input by the user.

When the finger on the first side is a finger of the left hand, the first side of the terminal is the left side of the terminal; or when the finger on the first side is a finger of the right hand, the first side of the terminal is the right side of the terminal.

For example, as shown in (a) in FIG. 4, assuming that the mobile phone 100 determines that a gesture (that is, the first gesture) corresponding to the sliding track 402 is a gesture input by the finger of the right hand of the user, as shown in (b) in FIG. 4, the mobile phone 100 may display a first touch panel 403 in a frequently used touch area on a right side of the first interface 401.

It should be noted that in this application, the left side of the terminal is a side close to a left-side edge of the mobile phone after the touchscreen of the terminal is divided into two parts along a vertical centerline (a centerline that is parallel to edges on left and right sides of the mobile phone) of the touchscreen, and the right side of the terminal is a side close to a right-side edge of the mobile phone after the touchscreen of the terminal is divided into two parts along the vertical centerline of the touchscreen.

Usually, as shown in (a) in FIG. 4, when the right hand of the user holds the mobile phone, fingers of the user usually hold the bottom right of the mobile phone. Therefore, when the first side of the terminal is the right side of the terminal, the first side may be specifically the bottom right of the touchscreen of the terminal. As shown in (b) in FIG. 4, the mobile phone 100 may display the first touch panel 403 on the bottom right of the touchscreen of the mobile phone 100. Similarly, when the first side of the terminal is the left side of the terminal, the first side may be specifically the bottom left of the touchscreen of the terminal.

S303: The terminal displays a second interface in response to a second gesture input by the user on the first touch panel, where the second interface includes an interface element displayed by the terminal in response to a third gesture input by the user in a corresponding position on the first interface.

Figure 5:
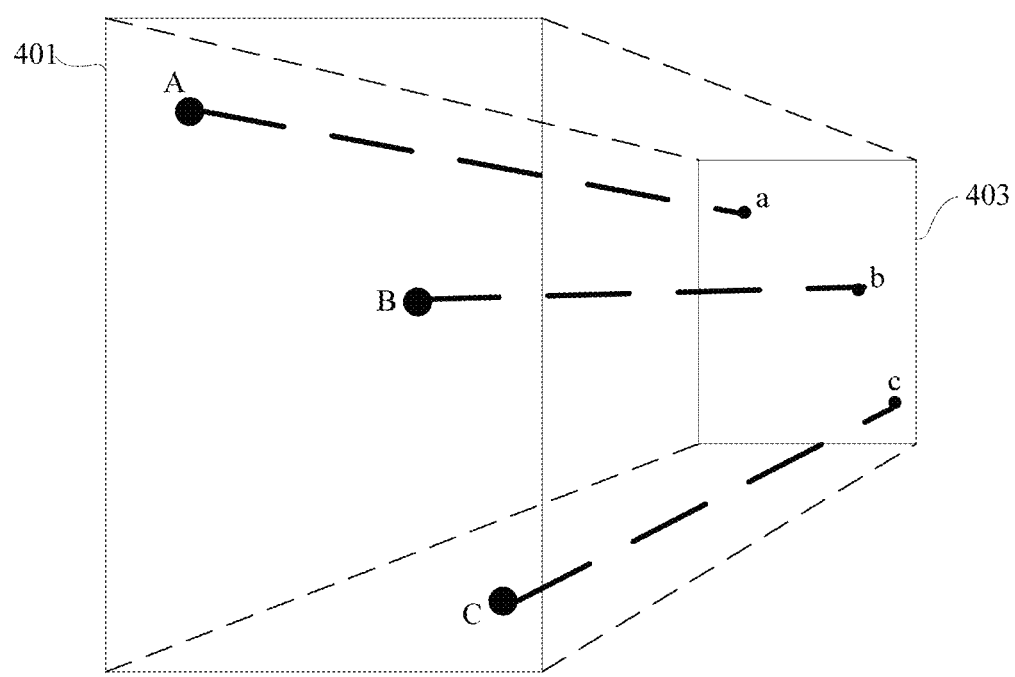
FIG. 5 is an example schematic diagram of a mapping between a first interface and a first touch panel according to this application.

The first touch panel is used for operate thing first interface in response to a gesture input by the user. That is, an operation of the user on the first touch panel may be mapped to an identical operation of the user on the first interface. In other words, touch points on the first touch panel may be in one-to-one mapping with touch points in corresponding positions on the first interface. For example, as shown in FIG. 5, a touch point a on the first touch panel 403 may be mapped to a touch point A on the first interface 401, a touch point b on the first touch panel 403 may be mapped to a touch point B on the first interface 401, and a touch point c on the first touch panel 403 may be mapped to a touch point C on the first interface 401.

Figure 6A:
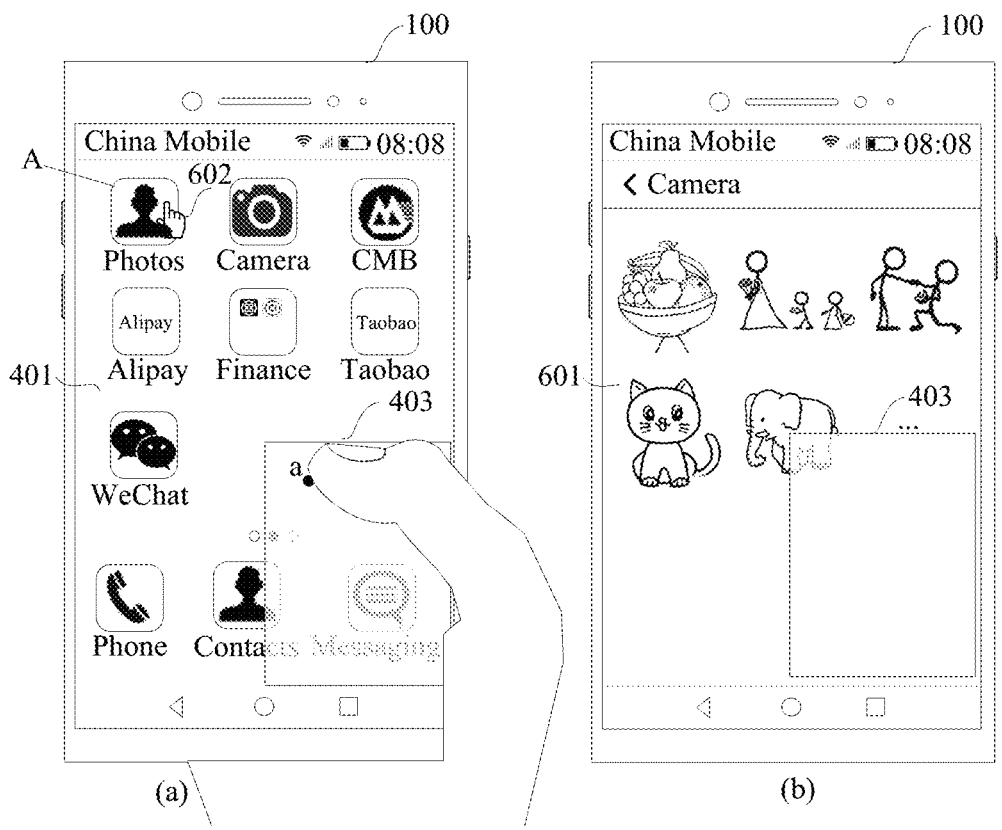
FIG. 6A is an example schematic diagram 3 of a terminal interface of a mobile phone according to this application.

For example, it is assumed that when the user touches the touch point A on the first interface 401, the terminal can display a terminal interface X in response to the touch operation of the user on the touch point A on the first interface 401. Then, when the user touches the touch point a on the first touch panel 403, the terminal can display, in response to the touch operation of the user on the touch point a on the first touch panel 403, a terminal interface Y including all interface elements on the terminal interface X. The terminal interface Y is different from the terminal interface X in that the terminal interface Y may further include the first touch panel 403. Certainly, the terminal interface Y may alternatively not include the first touch panel 403. That is, the terminal interface Y is completely identical to the terminal interface X For example, as shown in (a) in FIG. 6A, it is assumed that the touch point a on the first touch panel 403 may be mapped to the touch point A at which an icon of a "Photos" application is located on the first interface 401. Then, as shown in (a) in FIG. 6A, when a finger of the user touches the touch point a on the first touch panel 403, the mobile phone 100 can start the "Photos" application, and display a photo list interface 601 and the first touch panel 403 shown in (b) in FIG. 6A. Certainly, the first touch panel 403 in (b) in FIG. 6A is optional. The mobile phone 100 may not display the first touch panel 403 in (b) in FIG. 6A.

It should be emphasized that, to avoid inability to determine a touch point that is on the first interface and that corresponds to a touch point touched by the finger of the user on the first touch panel when the user operates the first interface by using the first touch panel, when the finger of the user touches any touch point on the first touch panel, the terminal displays, on the first interface, a cursor at a position corresponding to a touch point mapped to the touch point. The cursor may move along with a movement of the finger of the user on the first touch panel.

For example, as shown in (a) in FIG. 6A, when the finger of the user touches the touch point a on the first touch panel 403, the mobile phone 100 can display a cursor 602 at a position in which the icon of the "Photos" application is located. In addition, when the finger of the user touches the touch point a on the first touch panel 403, the mobile phone 100 can alternatively display the icon of the "Photos" application in a dynamic display manner in which the icon of the "Photos" application is presented when the icon of the "Photos" application is touched.

Figure 6B:
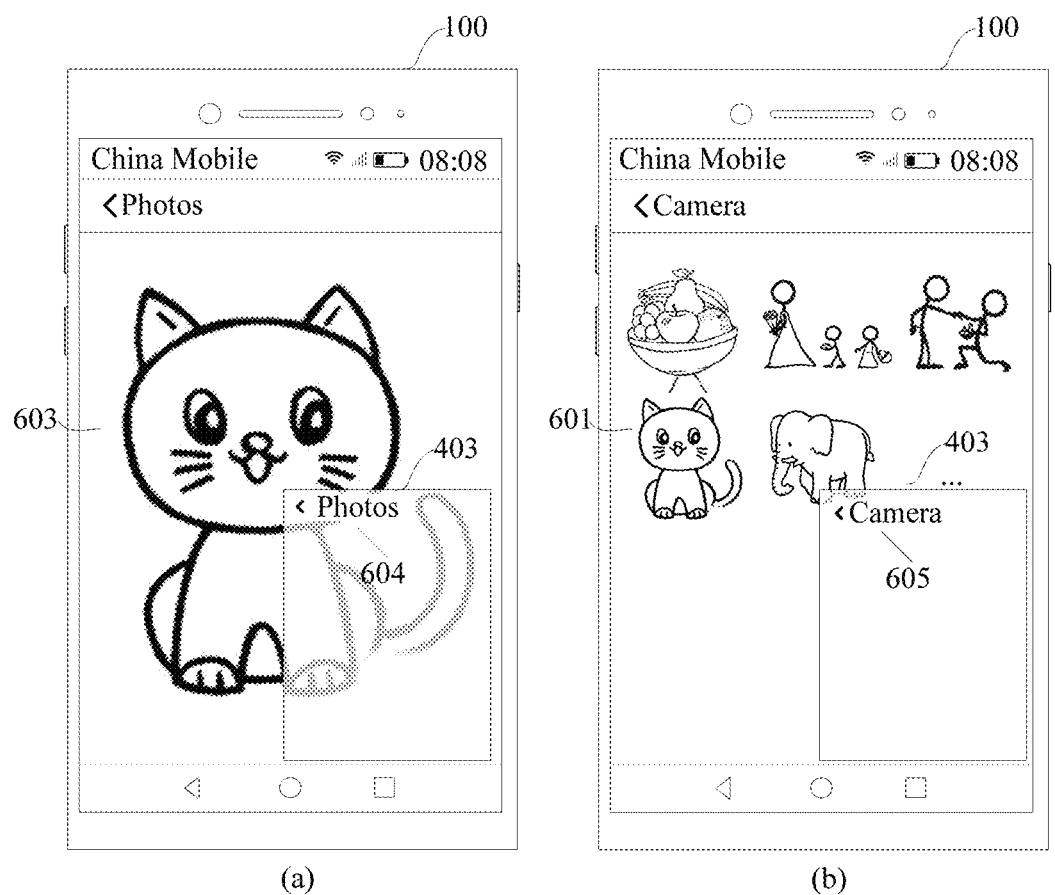
FIG. 6B is an example schematic diagram 4 of a terminal interface of a mobile phone according to this application.

In one embodiment, to facilitate user operation, the first touch panel may further display some operable interface elements on the first interface, such as a "Back" key and a "Share" key. For example, as shown in (a) in FIG. 6B, when the first interface displays a photo interface 603, the first touch panel 403 may further include a "Back" key 604 of the photo list interface 601. When the user touches the "Back" key 604, the mobile phone 100 can display a display interface shown in (b) in FIG. 6B. Compared with the first touch panel 403 shown in (b) in FIG. 6A, the first touch panel 403 shown in (b) in FIG. 6B may further include a "Back to camera" key 605. After the user touches the "Back to camera" key 605, the mobile phone 100 can start a camera in response to the touch operation of the user on the "Back to camera" key 605.

The terminal can determine a size and a shape of the first touch panel based on a habit of using the terminal by the user. For example, the right hand of the user holds the mobile phone 100. As shown in (a) in FIG. 7, the mobile phone 100 can collect statistics on a longest distance L1 to a right-side edge of the mobile phone 100 that is reachable by a right-hand thumb of the user and a longest distance L2 to a lower edge of the mobile phone 100 that is reachable by the right-hand thumb of the user when the right hand of the user holds the mobile phone. Then, the mobile phone 100 can determine, based on lengths of L1 and L2, the first touch panel 403 to be displayed by the mobile phone 100 when the first gesture is a gesture input by a finger of the right hand of the user, as shown in (b) in FIG. 7.

Figure 7:
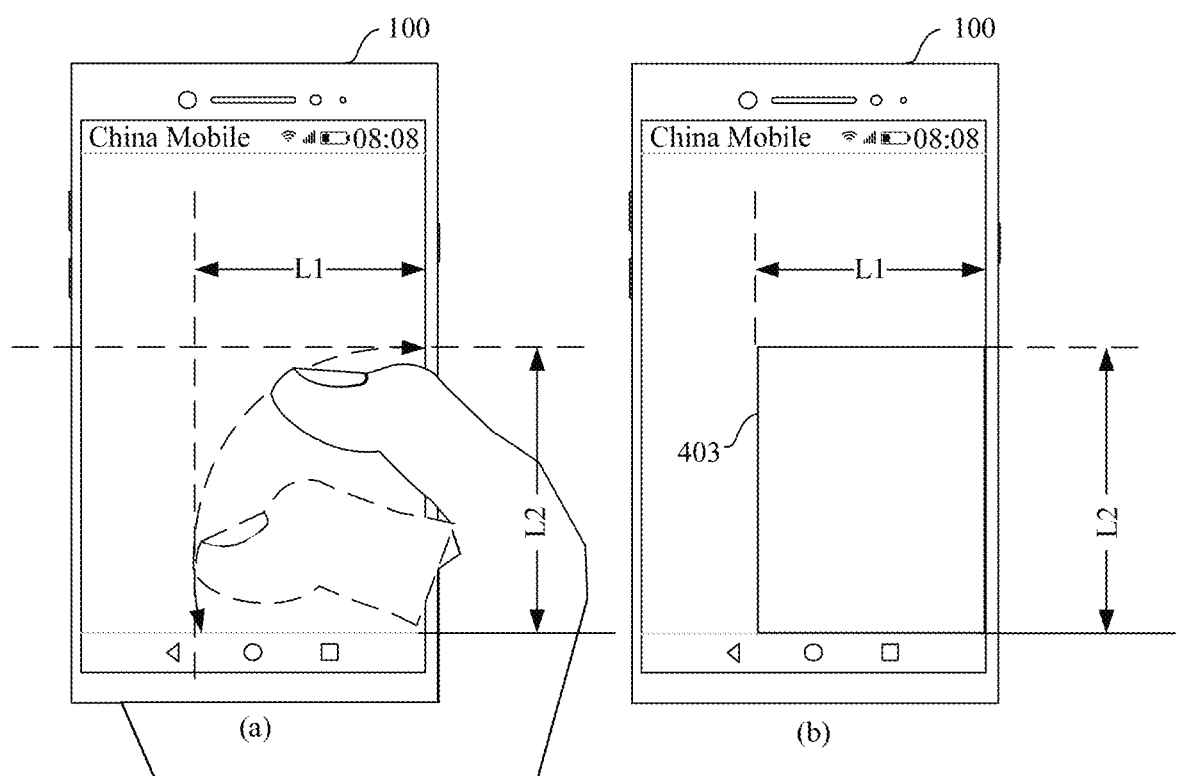
FIG. 7 is an example schematic diagram 5 of a terminal interface of a mobile phone according to this application.

The first touch panel in this application includes but is not limited to the first touch panel 403 shown in (b) in FIG. 7. To better accommodate to a use habit of the user, the mobile phone 100 can collect statistics on the longest distance L1 to the right-side edge of the mobile phone 100 that is reachable by the right-hand thumb of the user and the longest distance L2 to the lower edge of the mobile phone 100 that is reachable by the right-hand thumb of the user when the right hand of the user holds the mobile phone. Then, the mobile phone 100 can determine, based on the lengths of L1 and L2, a fan-shaped curve 801 shown in (a) in FIG. 8. When the first gesture is a gesture input by a finger of the right hand of the user, the mobile phone 100 can display a first touch panel 802, corresponding to the fan-shaped curve 801, as shown in (b) in FIG. 8.

Figure 8:
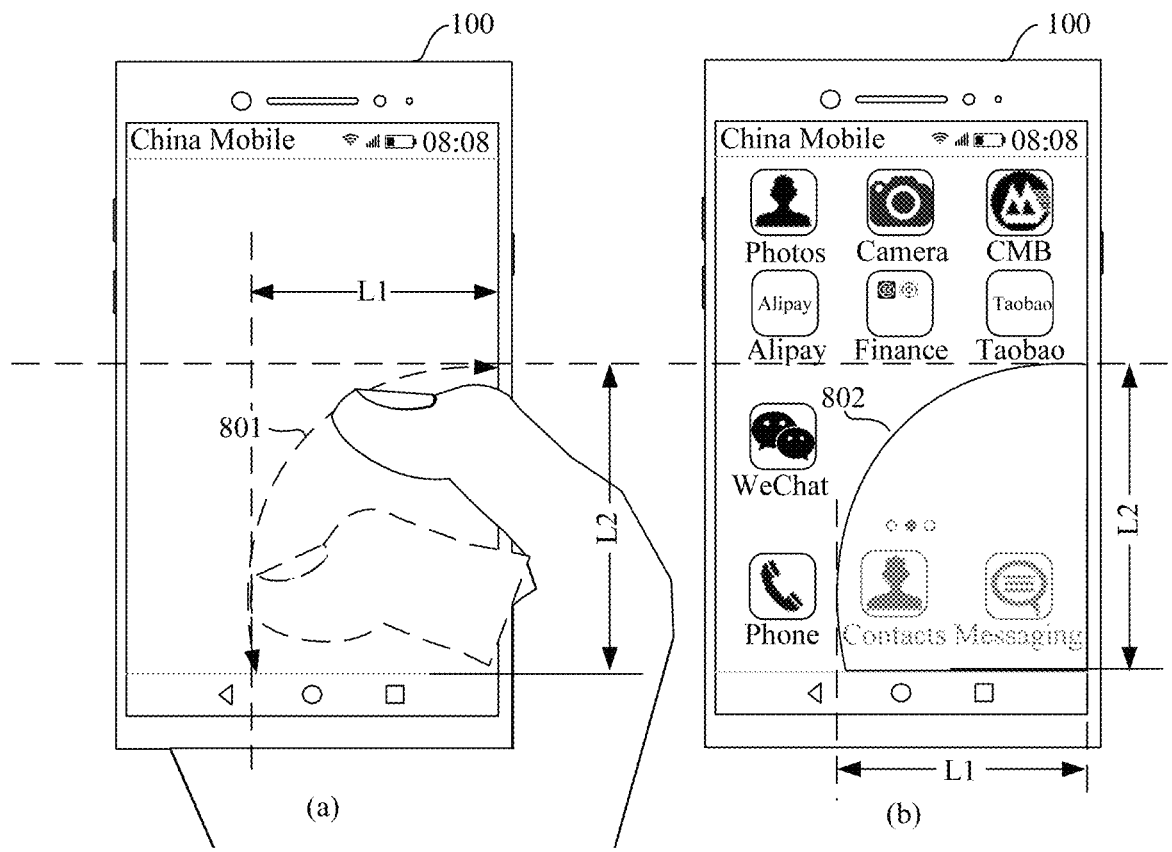
FIG. 8 is an example schematic diagram 6 of a terminal interface of a mobile phone according to this application.

FIG. 7 and FIG. 8 show only two examples of the first touch panel in this application. A size and a shape of the first touch panel include but are not limited to the first touch panels shown in FIG. 7 and FIG. 8.

According to the terminal interface display method provided in this application, the gesture input by the user on the touchscreen can be identified, to determine whether the user operates the mobile phone with the left hand or the right hand. This can avoid a problem of relatively high costs due to addition of an extra hardware device. In addition, in this application, when identifying that the user operates the terminal with a finger on the first side (such as the left hand or the right hand), the terminal can display, on the terminal interface, the first touch panel that can be used for operating the terminal interface, so that the user can operate, on the first touch panel, all content on the terminal interface. In this way, the user is able to operate an area that is on the terminal interface and that is not reachable by the finger on the first side, without affecting the user's visual and operation experience. In addition, displaying the first touch panel in the frequently used touch area on the first side can further help the user operate, on the first touch panel, all content on the terminal interface.

Figure 9:
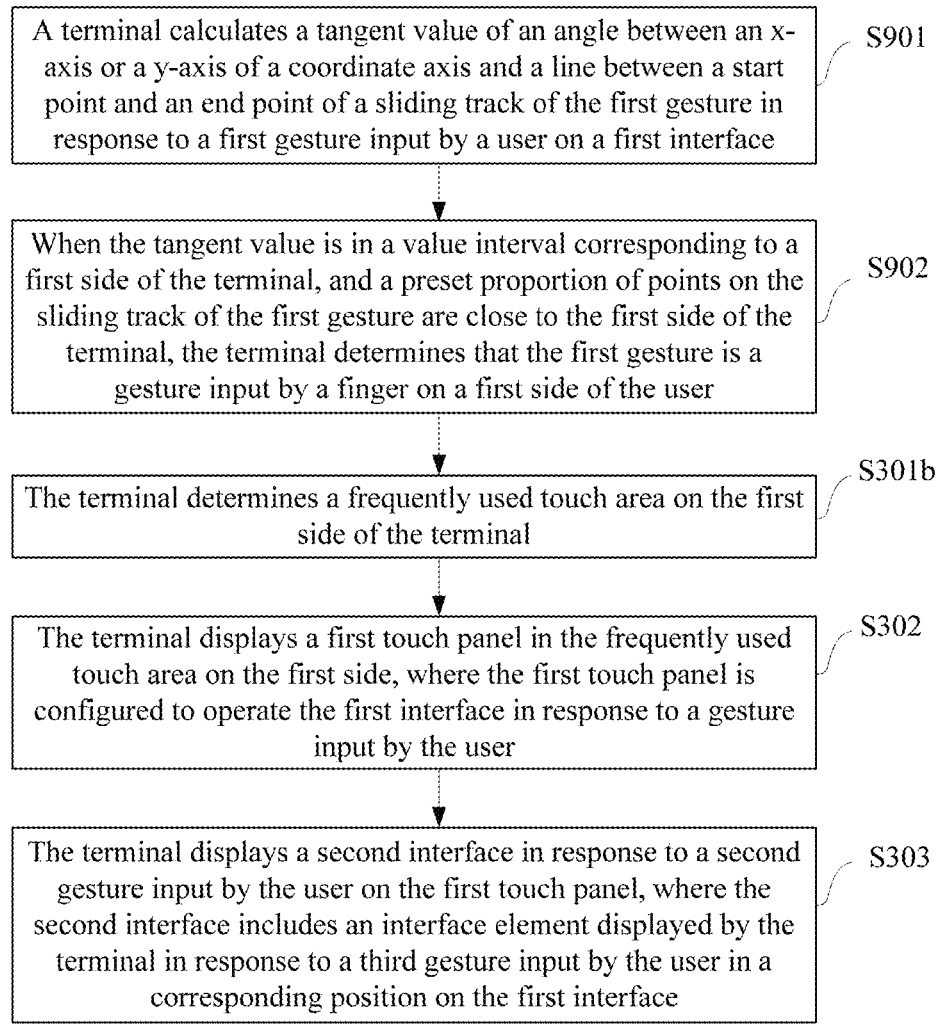
FIG. 9 is a flowchart 2 of a terminal interface display method according to this application.

In one embodiment, the terminal may calculate a tangent value of an angle between an x-axis or a y-axis of a coordinate axis and a line between a start point and an end point of the sliding track of the first gesture, and determine, based on a value range of the tangent value and a distribution status of points on the sliding track of the first gesture on the terminal interface, whether the first gesture is a gesture input by the left hand of the user or a gesture input by the right hand of the user. Specifically, in this embodiment, S301a may be replaced by S901 and S902. For example, as shown in FIG. 9, S301a in FIG. 3 may be replaced by S901 and S902.

S901: A terminal calculates, a tangent value of an angle between an x-axis or a y-axis of a coordinate axis and a line between a start point and an end point of a sliding track of a first gesture in response to the first gesture input by a user on a first interface.

Figure 10:
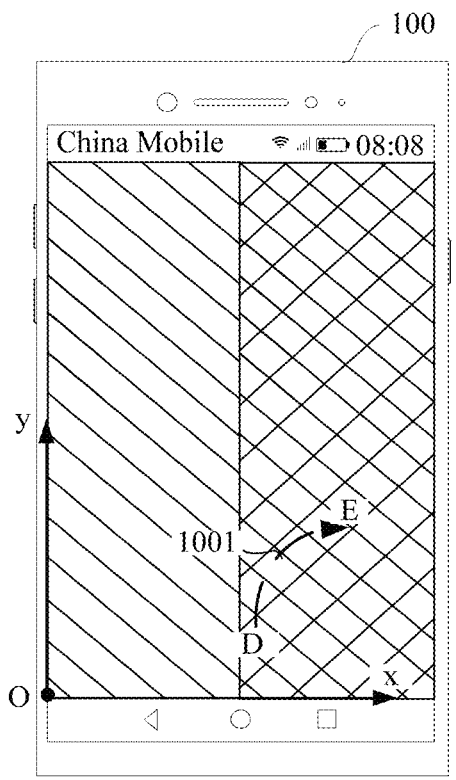
FIG. 10 is an example schematic diagram of a coordinate axis on a mobile phone and a touch point in the coordinate axis.
Figure 10:
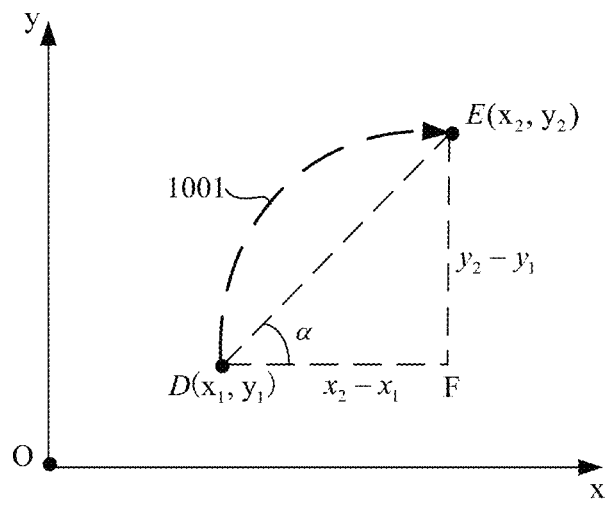

For example, as shown in (a) in FIG. 10, it is assumed that the mobile phone 100 receives a sliding track 1001 corresponding to the first gesture input by the user on the touchscreen of the mobile phone 100. A start point of the sliding track 1001 is a point D, and an end point of the sliding track 1001 is a point E. As shown in (b) in FIG. 10, coordinates of the point D are D($x_1$, $y_1$), coordinates of the point E are E($x_2$, $y_2$), and a line between the start point and the end point of the sliding track 1001 is a line segment EF. Then, an angle between the line segment EF and an x-axis is α shown in (b) in FIG. 10, where $$\tan\alpha = \frac{y_2 - y_1}{x_2 - x_1}.$$

S902: When the tangent value is in a value interval corresponding to a first side of the terminal, and a preset proportion of points on the sliding track of the first gesture are close to the first side of the terminal, the terminal determines that the first gesture is a gesture input by a finger on a first side of the user.

The terminal can collect statistics on a tangent value of an angle between the x-axis or the y-axis of the coordinate axis and a line between a start point and an end point of a sliding track of a gesture input by a finger of a left hand of the user, and determine a data value interval corresponding to a left side of the terminal. The terminal can also collect statistics on a tangent value of an angle between the x-axis or the y-axis of the coordinate axis and a line between a start point and an end point of a sliding track of a gesture input by a finger of a right hand of the user, and determine a data value interval corresponding to a right side of the terminal.

As shown in (b) in FIG. 10, assuming that the data value interval corresponding to the right side of the terminal is [p, q], then when $$p \leq \frac{y_2 - y_1}{x_2 - x_1} \leq q,$$

the terminal can determine whether a preset proportion of points on the sliding track of the first gesture are close to the right side of the terminal; and when $$\frac{y_2 - y_1}{x_2 - x_1} \notin [p, q],$$

the terminal can determine whether a preset proportion of points on the sliding track of the first gesture are close to the left side of the terminal. Assuming $$p \leq \frac{y_2 - y_1}{x_2 - x_1} \leq q,$$

as shown in (a) in FIG. 10, all points on the sliding track 1001 of the first gesture are distributed in a display area on the right side of the mobile phone 100. Therefore, the mobile phone 100 can determine that the first gesture is a gesture input by a finger of the right hand of the user.

In one embodiment, the terminal may determine, by determining a value interval of the tangent value of the angle between the x-axis or the y-axis of the coordinate axis and the line between the start point and the end point of the sliding track of the first gesture, and distribution of points on the sliding track of the first gesture, whether the user operates the mobile phone with the left hand or the right hand. This can avoid a problem of relatively high costs due to addition of an extra hardware device.

Figure 11:
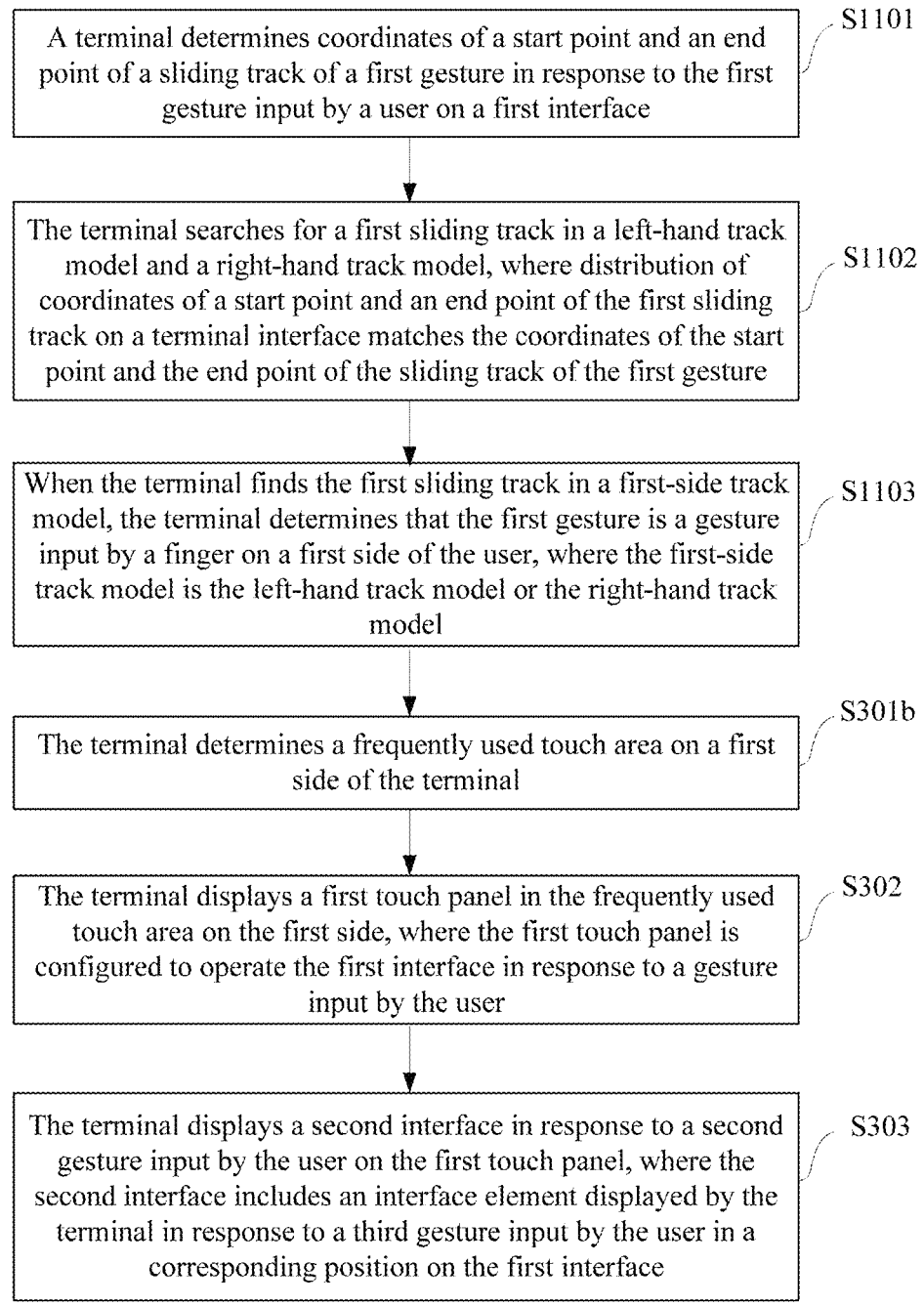
FIG. 11 is a flowchart 3 of a terminal interface display method according to this application.

In one embodiment, the terminal may determine coordinates of the start point and the end point of the sliding track of the first gesture, and search, in a prestored left-hand track model and a prestored right-hand track model, for a first sliding track, where distribution of coordinates of a start point and an end point of the first sliding track on the terminal interface matches the coordinates of the start point and the end point of the sliding track of the first gesture. If the terminal finds the first sliding track in the left-hand track model, the terminal can determine that the first gesture is a gesture input by the left hand of the user; or if the terminal finds the first sliding track in the right-hand track model, the terminal can determine that the first gesture is a gesture input by the right hand of the user. Specifically, in this embodiment, S301a may be replaced by S1101 to S1103. For example, as shown in FIG. 11, S301a in FIG. 3 may be replaced by S1101 to S1103.

S1101: A terminal determines coordinates of a start point and an end point of a sliding track of a first gesture in response to the first gesture input by a user on a first interface.

For a method of determining the coordinates of the start point and the end point of the sliding track of the first gesture by the terminal in response to the first gesture input by the user on the first interface, refer to the foregoing related descriptions in this application. Details are not described herein again in this application.

S1102: The terminal searches for a first sliding track in a left-hand track model and a right-hand track model, where distribution of coordinates of a start point and an end point of the first sliding track on a terminal interface matches the coordinates of the start point and the end point of the sliding track of the first gesture.

The left-hand track model includes coordinates of at least one left-hand sliding track, and the right-hand track model includes coordinates of at least one right-hand sliding track.

It should be noted that in this application, that the distribution of the coordinates of the start point and the end point of the first sliding track on the terminal interface matches the coordinates of the start point and the end point of the sliding track of the first gesture specifically means: the coordinates of the start point of the first sliding track are identical to the coordinates of the start point of the sliding track of the first gesture, and the coordinates of the end point of the first sliding track are identical to the coordinates of the end point of the sliding track of the first gesture.

Alternatively, the left-hand track model or the right-hand track model includes value ranges of the coordinates of the start point of the first sliding track and value ranges of the coordinates of the end point of the first sliding track. In this application, that the distribution of the coordinates of the start point and the end point of the first sliding track on the terminal interface matches the coordinates of the start point and the end point of the sliding track of the first gesture specifically means: the coordinates of the start point of the first gesture are in the value ranges of the coordinates of the start point of the first sliding track, and the coordinates of the end point of the sliding track of the first gesture are in the value ranges of the coordinates of the end point of the first sliding track.

Figure 12:
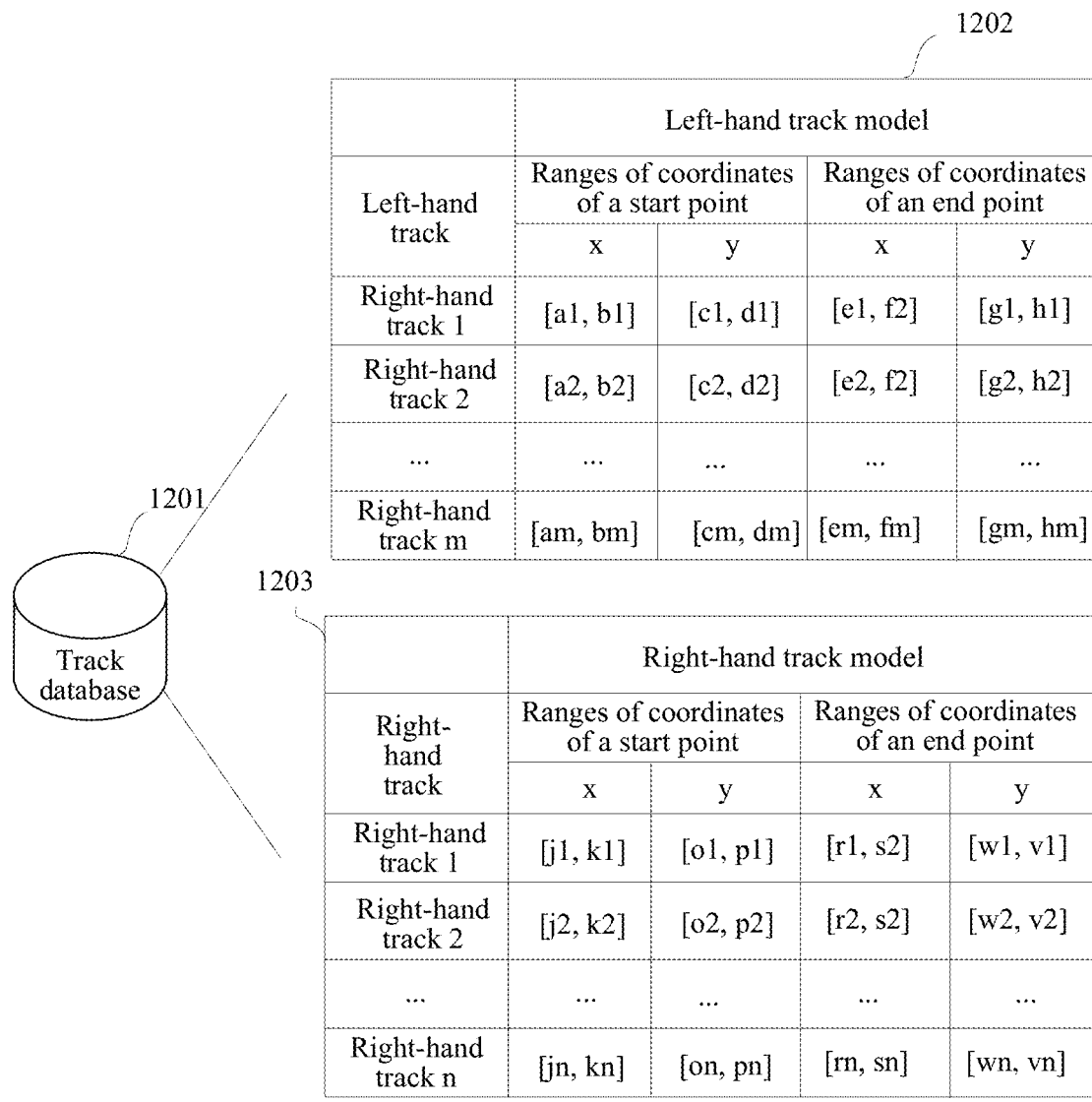
FIG. 12 is an example schematic diagram of a track database according to this application.

For example, a track database 1201 shown in FIG. 12 may be maintained in the terminal in this application, where the track database 1201 includes a left-hand track model 1202 and a right-hand track model 1203. The left-hand track model 1202 includes value ranges of coordinates of start points and end points of the at least two left-hand tracks, and the right-hand track model 1202 includes value ranges of coordinates of start points and end points of the at least two right-hand tracks.

As shown in FIG. 12, the left-hand track model 1202 includes: a value range [a1, b1] of x in coordinates of a start point of a left-hand track 1, a value range [c1, d1] of y in the coordinates of the start point of the left-hand track 1, a value range [e1, f1] of x in coordinates of an end point of the left-hand track 1, and a value range [g1, h1] of y in the coordinates of the end point of the left-hand track 1; a value range [a2, b2] of x in coordinates of a start point of a left-hand track 2, a value range [c2, d2] of y in the coordinates of the start point of the left-hand track 2, a value range [e2, f2] of x in coordinates of an end point of the left-hand track 2, and a value range [g2, h2] of y in the coordinates of the end point of the left-hand track 2; . . . ; a value range [am, bm] of x in coordinates of a start point of a left-hand track m, a value range [cm, dm] of y in the coordinates of the start point of the left-hand track m, a value range [em, fm] of x in coordinates of an end point of the left-hand track m, and a value range [gm, hm] of y in the coordinates of the end point of the left-hand track m.

As shown in FIG. 12, the right-hand track model 1203 includes: a value range [j1, k1] of x in coordinates of a start point of a right-hand track 1, a value range [o1, o1] of y in the coordinates of the start point of the right-hand track 1, a value range [r1, s1] of x in coordinates of an end point of the right-hand track 1, and a value range [w1, v1] of y in the coordinates of the end point of the right-hand track 1; a value range [j2, k2] of x in coordinates of a start point of a right-hand track 2, a value range [o2, o2] of y in the coordinates of the start point of the right-hand track 2, a value range [r2, s2] of x in coordinates of an end point of the right-hand track 2, and a value range [w2, v2] of y in the coordinates of the end point of the right-hand track 2; . . . ; a value range [jn, kn] of x in coordinates of a start point of a right-hand track n, a value range [on, on] of y in the coordinates of the start point of the right-hand track n, a value range [rn, sn] of x in coordinates of an end point of the right-hand track n, and a value range [wn, vn] of y in the coordinates of the end point of the right-hand track n.

S1103: When the terminal finds the first sliding track in a first-side track model, the terminal determines that the first gesture is a gesture input by a finger on a first side of the user, where the first-side track model is the left-hand track model or the right-hand track model.

It is assumed that the coordinates of the start point of the sliding track of the first gesture are $D(x_1, y_1)$, and the coordinates of the end point of the sliding track of the first gesture are $E(x_2, y_2)$. The terminal can search, in the right-hand track model 1203 and the left-hand track model 1202 shown in FIG. 12, for a first sliding track, where the first sliding track is a left-hand track or a right-hand track, and $x_1$, $y_1$, $x_2$, and $y_2$ respectively fall into ranges of coordinates of a start point and an end point of the left-hand track or the right-hand track. For example, assuming that $x_1 \in [j2, k2]$, $y_1 \in [o2, o2]$, $x_2 \in [r2, s2]$, and $y_2 \in [w2, v2]$, that is, $x_1$, $y_1$, $x_2$, and $y_2$ respectively fall into the ranges of the coordinates of the start point and the end point of the right-hand track 2 in the right-hand track model 1203, the terminal can determine that the first gesture is a gesture input by a finger of the right hand of the user.

Figure 13:
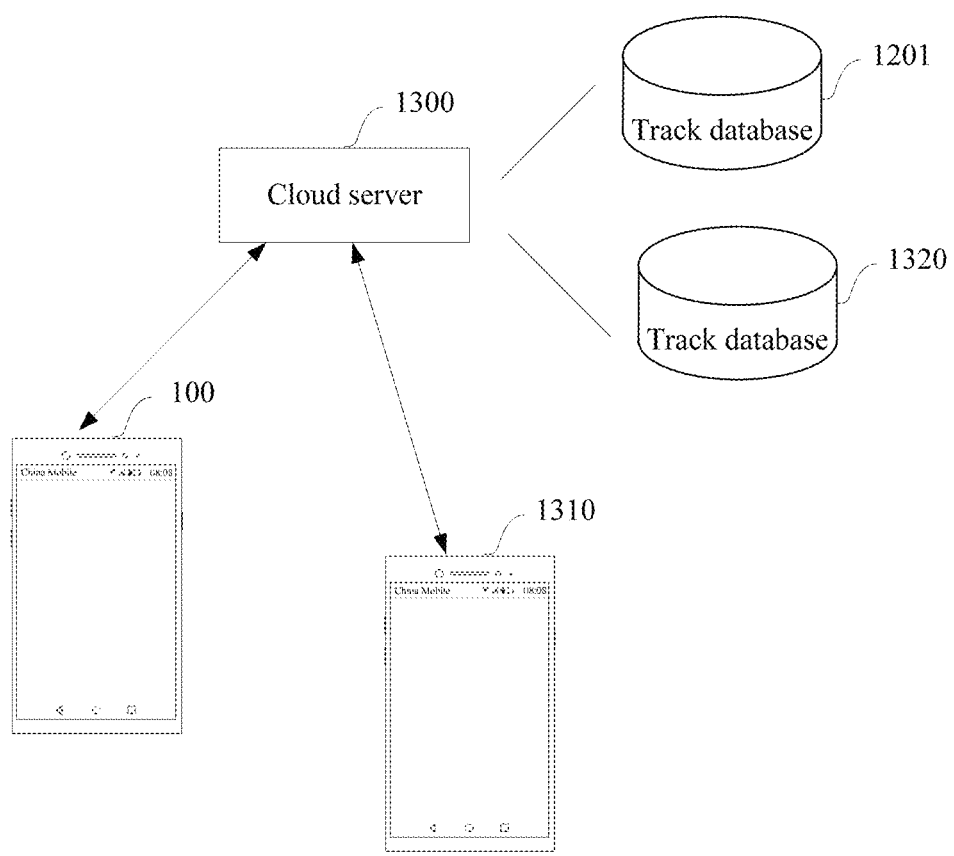
FIG. 13 is an example schematic diagram of a network architecture to which a terminal interface display method is applied according to this application.

In one embodiment, the track database may alternatively be included in a cloud server. Because different users have different habits of using terminals, the cloud server may maintain a track database specific to each user terminal. As shown in FIG. 13, the cloud server may include a track database 1201 and a track database 1320. The track database 1201 stores a left-hand track model and a right-hand track model of a mobile phone 100. The track database 1320 stores a left-hand track model and a right-hand track model of a mobile phone 1310. The mobile phone 100 is used as an example. When the mobile phone 100 receives a first gesture input by a user, the mobile phone 100 may send coordinates of a start point and an end point of the first gesture to the cloud server. The cloud server searches for a first sliding track in the left-hand track model and the right-hand track model in the track database 1201, and returns a search result to the mobile phone 100.

Ranges of coordinates of sliding tracks stored in the left-hand track model and the right-hand track model may be obtained through the terminal's collection of statistics on coordinates of sliding tracks of a plurality of gestures input by the user.

In one embodiment, because a terminal may be used by different users, or habits of a user in using a mobile phone may change in different time segments, the terminal may update a left-hand track model and a right-hand track model of the terminal based on coordinates of sliding tracks collected by the terminal recently (for example, in one month). Alternatively, when the left-hand track model and the right-hand track model of the terminal are stored in the cloud server, the terminal may report, to the cloud server, the coordinates of the sliding tracks collected by the terminal recently (for example, in one month), so that the cloud server can update the left-hand track model and the right-hand track model of the terminal.

In one embodiment, the terminal can collect statistics on coordinates of sliding tracks of a plurality of gestures input by the user without user awareness. Specifically, before S301*a* or S1102, the method in this application may further include S1301.

S1301: The terminal determines, in response to a fourth gesture input by the user on the terminal interface, that the fourth gesture is a gesture input by the finger on the first side of the user; and stores coordinates of a sliding track of the fourth gesture in the first-side track model.

For a specific method of "determining, by the terminal, that the fourth gesture is a gesture input by the finger on the first side of the user" in S1301, refer to the detailed descriptions in S301 in this application. Details are not described herein again in this application.

In one embodiment, the terminal can collect statistics on coordinates of sliding tracks of a plurality of gestures input by the user (which is equivalent to a gesture habit of the user on the touchscreen of the terminal) without user awareness, and store the coordinates of the sliding tracks in the first-side track model, so that after subsequently receiving the first gesture input by the user, the terminal can compare the coordinates of the sliding tracks in the left-hand track model and the right-hand track model, to determine whether the first gesture is a gesture input by the left hand of the user or a gesture input by the right hand of the user.

In one embodiment, the terminal may instruct, in a targeted manner, the user to input a gesture with the left hand or input a gesture with the right hand. After the terminal instructs, in a targeted manner, the user to input a left-hand gesture, the terminal can collect coordinates of a sliding track of the left-hand gesture input by the user according to the terminal instruction; or after the terminal instructs, in a targeted manner, the user to input a right-hand gesture, the terminal can collect coordinates of a sliding track of the right-hand gesture input by the user according to the terminal instruction. This can improve accuracy of the coordinates of the sliding tracks stored in the first-side track model.

Figure 14:
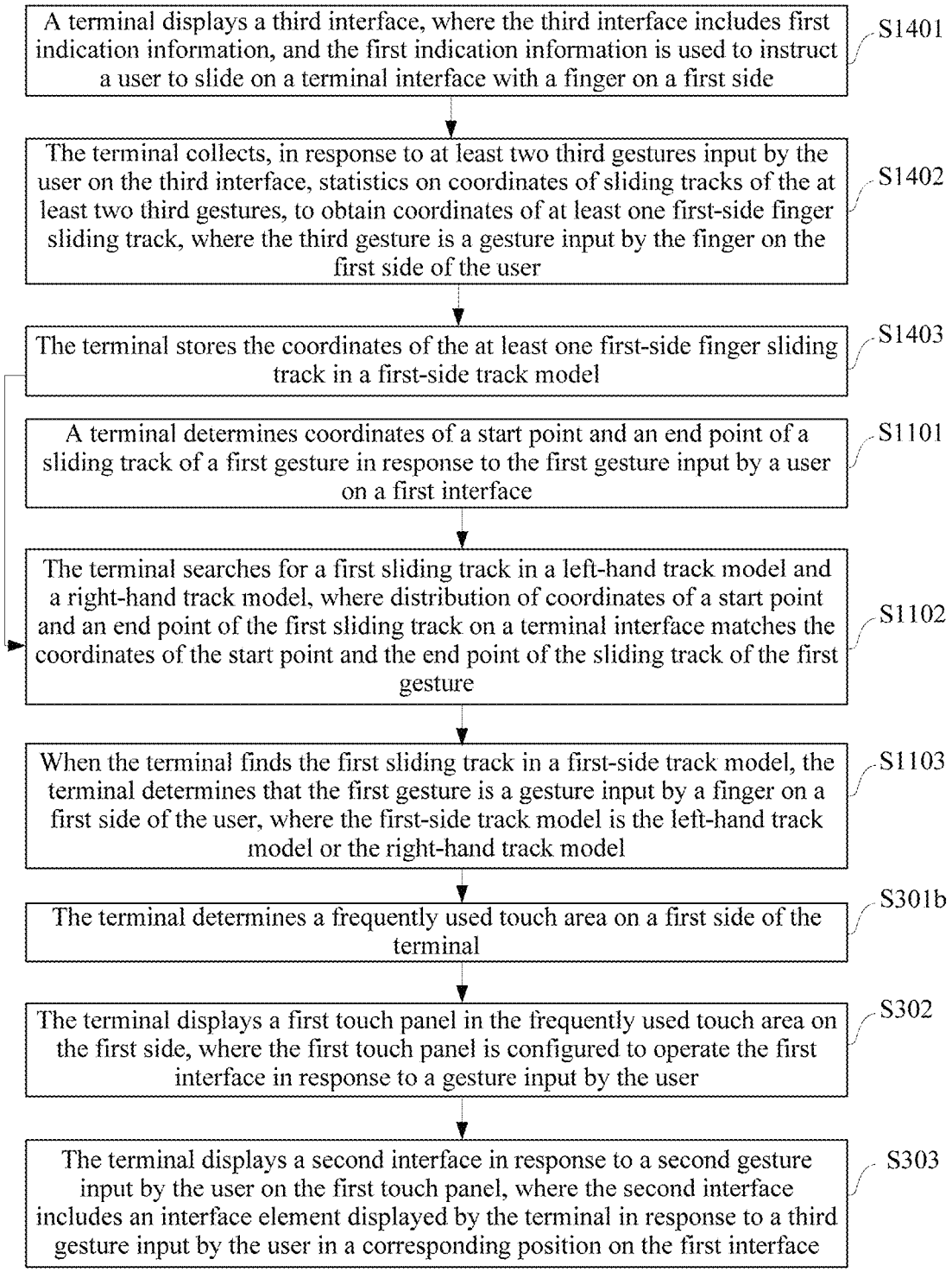
FIG. 14 is a flowchart 4 of a terminal interface display method according to this application.

In one embodiment, before S301a or S1102, the method in this application may further include S1401. For example, as shown in FIG. 14, before S1102 shown in FIG. 11, the method in this application may further include S1401 to S1403.

S1401: The terminal displays a third interface, where the third interface includes first prompt information, and the first prompt information is used to prompt the user to slide on the terminal interface with the finger on the first side.

Figure 15:
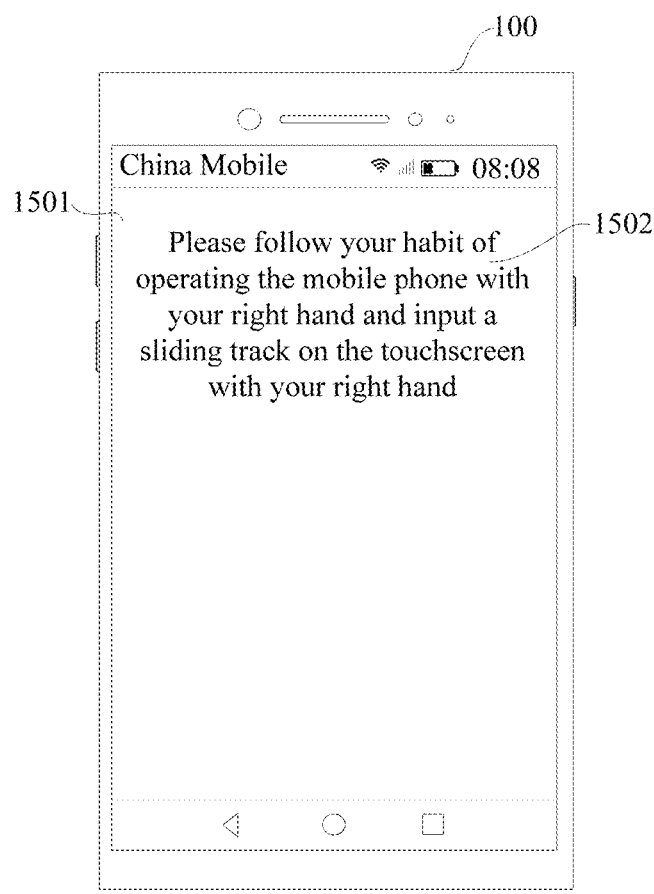
FIG. 15 is an example schematic diagram 7 of a terminal interface of a mobile phone according to this application.

For example, as shown in FIG. 15, the mobile phone 100 may display a third interface 1501, and the third interface 1501 may include first prompt information 1502 "Please follow your habit of operating the mobile phone with your right hand and input a sliding track on the touchscreen with your right hand". The first prompt information in this application includes but is not limited to the first prompt information 1502 shown in FIG. 15.

In one embodiment, a mobile phone is used as an example of the terminal. The mobile phone may display the third interface after the mobile phone is switched on or a one-handed mode is enabled for the mobile phone. The one-handed mode may include a left-hand mode and a right-hand mode. The left-hand mode is a display mode in which when the left hand of the user holds the mobile phone, the mobile phone controls an interface element displayed on a touchscreen of the mobile phone to display close to a left side of the mobile phone, to help the user operate the mobile phone with the left hand. The right-hand mode is a display mode in which when the right hand of the user holds the mobile phone, the mobile phone controls an interface element displayed on the touchscreen of the mobile phone to display close to a right side of the mobile phone, to help the user operate the mobile phone with the right hand.

S1402: The terminal collects, in response to at least two third gestures input by the user on the third interface, statistics on coordinates of sliding tracks of the at least two third gestures, to obtain coordinates of at least one first-side finger sliding track, where the third gesture is a gesture input by the finger on the first side of the user.

Figure 16:
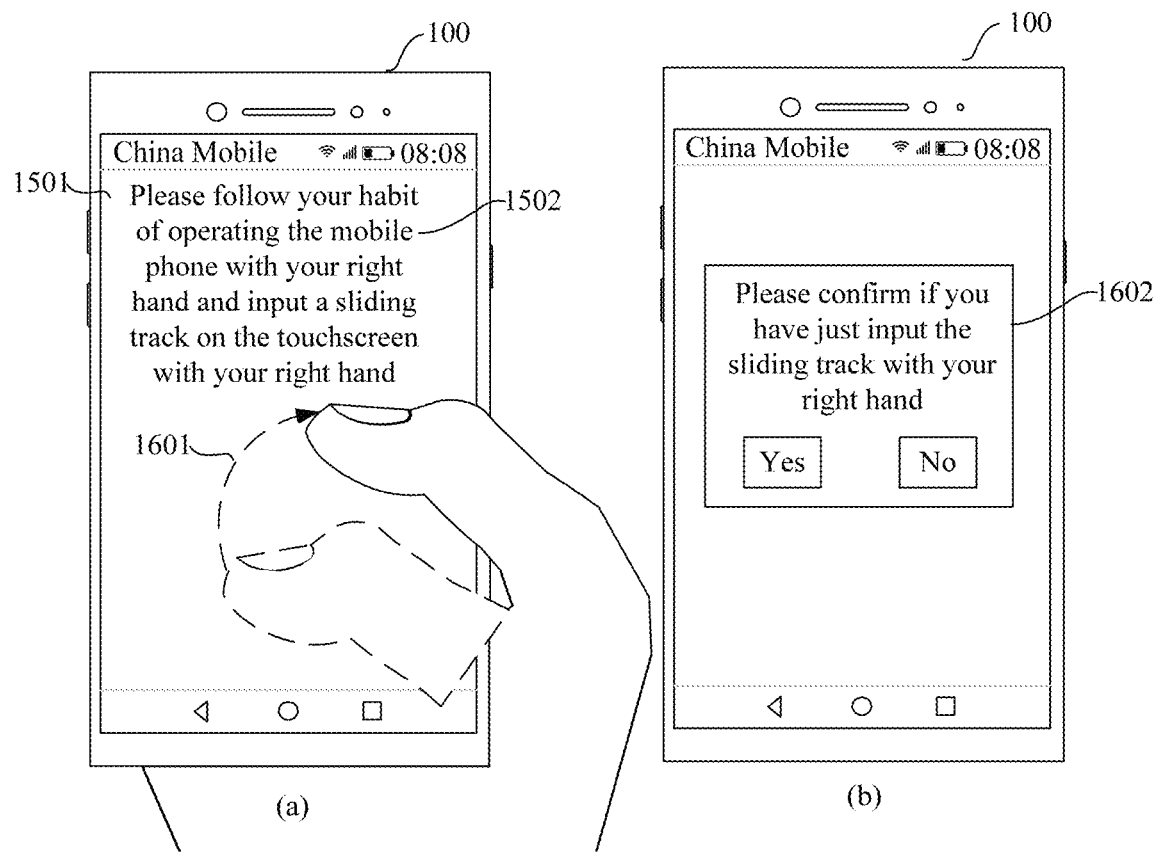
FIG. 16 is an example schematic diagram 8 of a terminal interface of a mobile phone according to this application.

For example, as shown in (a) in FIG. 16, the mobile phone 100 may receive a third gesture (that is, a gesture corresponding to a sliding track 1601) input by the user on the third interface 1501. The terminal may receive a plurality of third gestures input by the user on the third interface, and then collect statistics on coordinates of sliding tracks of the plurality of third gestures. Specifically, the terminal classifies the sliding tracks of the plurality of third gestures, to obtain coordinates of one or more first-side finger sliding tracks.

S1403: The terminal stores the coordinates of the at least one first-side finger sliding track in the first-side track model.

In one embodiment, the terminal may directly store the coordinates of the at least one first-side finger sliding track in the first-side track model. Certainly, to further improve accuracy of coordinates of a sliding track stored in the first-side track model, the terminal may further first determine, in response to the third gesture input by the user on the third interface, whether the third gesture is a gesture input by a finger of the left hand of the user or a gesture input by a finger of the right hand of the user, then confirm with the user whether the terminal performs correct determining, and after the user confirms that the terminal performs correct determining, store the coordinates of the corresponding sliding track. Specifically, S1401 to S1403 may be replaced by S1601 to S1603.

S1601: The terminal displays a third interface, where the third interface includes first prompt information, and the first prompt information is used to prompt the user to slide on the terminal interface with the finger on the first side.

For the third interface in S1601, refer to the detailed descriptions of the third interface in S1401 in this application. Details are not described herein again in this application.

S1602: The terminal determines, in response to the third gesture input by the user on the third interface, that the third gesture is a gesture input by the finger on the first side of the user, and displays a fourth interface, where the fourth interface includes prompt information used to determine whether the third gesture is a gesture input by the finger on the first side of the user.

For a specific method of "determining, by the terminal, that the third gesture is a gesture input by the finger on the first side of the user" in S1602, refer to the detailed descriptions in S301 in this application. Details are not described herein again in this application.

For example, as shown in (a) in FIG. 16, after the user inputs the sliding track 1601 on the third interface, the mobile phone 100 may display a fourth interface 1602 shown in (b) in FIG. 16, where the fourth interface 1602 includes the prompt information used to determine whether the third gesture is a gesture input by the finger on the first side of the user. As shown in (b) in FIG. 16, the fourth interface 1602 includes prompt information: "Please confirm if you have just input the sliding track with your right hand".

S1603: The terminal stores, in response to a first input of the user on the fourth interface, coordinates of a sliding track of the third gesture in the first-side track model, where the first input is used to indicate that the third gesture is a gesture input by the finger on the first side of the user.

For example, the first input of the user on the fourth interface may be a touch operation on a "Yes" option on the fourth interface 1602 shown in (b) in FIG. 16. After the user touches the "Yes" option on the fourth interface 1602, the mobile phone 100 can store the coordinates of the sliding track of the third gesture in the first-side track model.

Further, in S1601 to S1603, because the terminal can determine a sliding track of only one third gesture each time, after S1603, the method in this application may further include S1604 and S1605.

S1604: The terminal collects statistics on coordinates of sliding tracks of at least two third gestures stored in a preset period of time, to obtain coordinates of at least one first-side finger sliding track, where the third gesture is a gesture input by the finger on the first side of the user.

S1605: The terminal stores the coordinates of the at least one first-side finger sliding track in the first-side track model.

For S1604 and S1605, refer to the detailed descriptions in S1402 and S1403 in this application. Details are not described herein again in this application.

In one embodiment, the terminal may instruct, in a targeted manner, the user to input a gesture with the left hand or input a gesture with the right hand. In addition, after the user inputs a gesture according to the terminal instruction, the terminal can determine, through a process of performing determining twice, a finger on which side of the user inputs the gesture input by the user. To be specific, the terminal may first determine whether the third gesture is a gesture input by a finger of the left hand of the user or a gesture input by a finger of the right hand of the user, then confirm with the user whether the terminal performs correct determining, and after the user confirms that the terminal performs correct determining, store the coordinates of the corresponding sliding track. With the process of performing determining twice, accuracy of the coordinates of the sliding tracks stored in the first-side track model can be improved.

Figure 17:
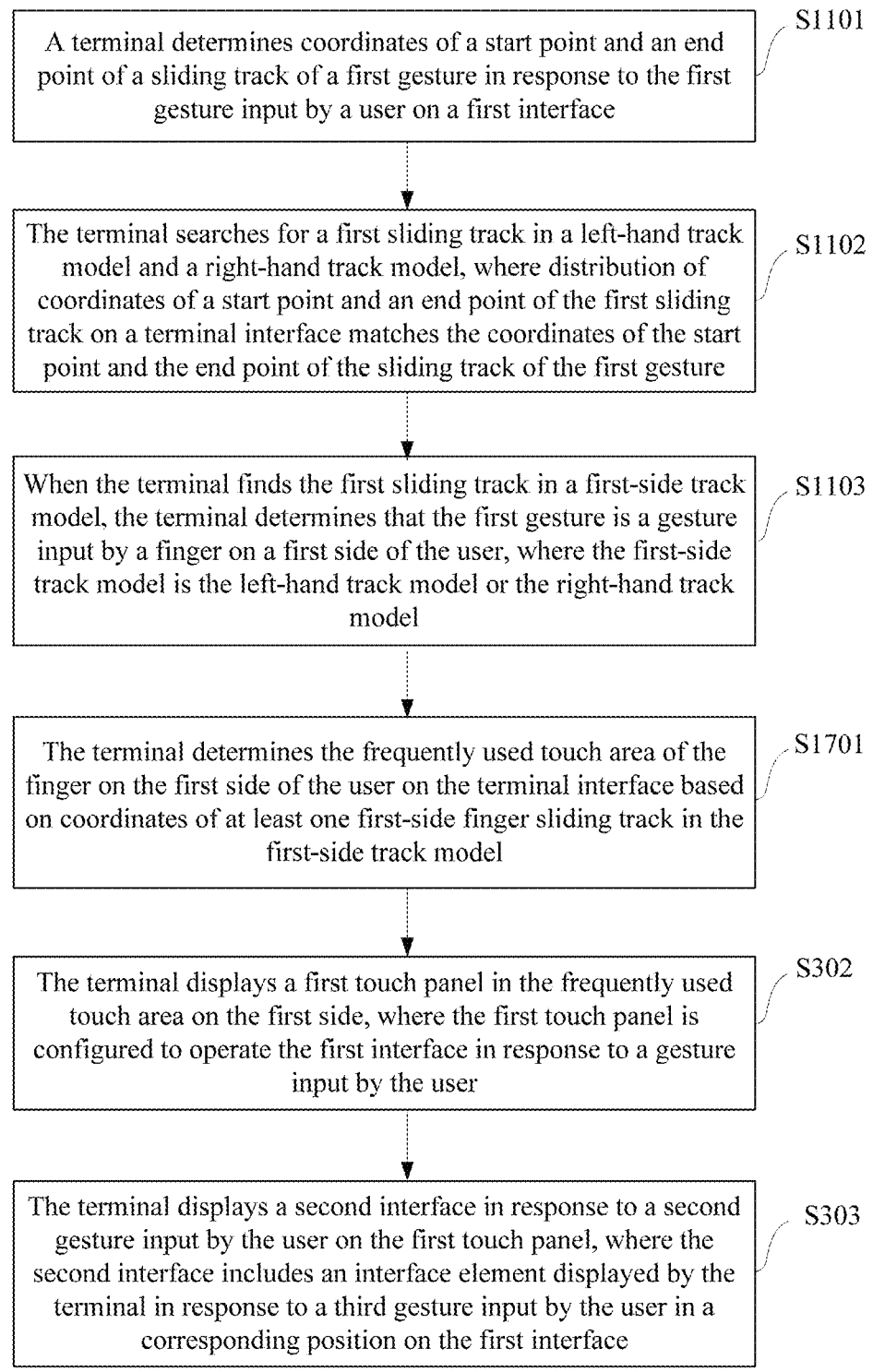
FIG. 17 is a flowchart 5 of a terminal interface display method according to this application.

Further, the terminal can determine, based on coordinates of a finger sliding track in the first-side track model, a frequently used touch area of the finger on the first side of the user on the terminal interface, and then determine the frequently used touch area as the frequently used touch area on the first side of the terminal. The frequently used touch area is a touch area that is on the terminal interface and that has undergone user touch whose frequency is greater than a preset threshold, or undergone user operation whose quantity of times is greater than the preset threshold. Specifically, S301b may be replaced by S1701. For example, as shown in FIG. 17, S301b shown in FIG. 11 may be replaced by S1701.

S1701: The terminal determines the frequently used touch area of the finger on the first side of the user on the terminal interface based on coordinates of at least one first-side finger sliding track in the first-side track model.

For detailed content of the first-side track model, refer to the descriptions of the first-side track model in the foregoing embodiment. Details are not described herein again in this application.

An example in which the terminal determines a frequently used touch area on the left side of the terminal is used. The terminal may divide a left display area (for example, the left display area of the mobile phone 100 shown in (a) in FIG. 10) on the touchscreen of the terminal into at least two display areas, then collect statistics on a quantity of times for which each of the at least two display areas is operated by the user, and determine a display area that has undergone user operation whose quantity of times is greater than the preset threshold as the frequently used touch area on the left side. In one embodiment, the left display area of the terminal includes but is not limited to the left display area of the mobile phone 100 shown in (a) in FIG. 10.

Alternatively, the terminal can analyze a distribution status of coordinates of left-hand tracks in the left-hand track model 1202 shown in FIG. 12, and determine an area with relatively dense distribution of the left-hand tracks as the frequently used touch area on the left side. The terminal can analyze a distribution status of coordinates of right-hand tracks in the right-hand track model 1203 shown in FIG. 12, and determine an area with relatively dense distribution of the right-hand tracks as the frequently used touch area on the right side.

Alternatively, an example in which the terminal determines a frequently used touch area on the right side of the terminal is used. The terminal can select two frequently triggered right-hand tracks from the right-hand track model 1203 shown in FIG. 12, where the two frequently triggered left-hand tracks are right-hand tracks ranking the top two in right-hand tracks that are triggered by the user on the touchscreen of the terminal and that are arranged in descending order of quantity of times or frequency of being triggered. Then the terminal can determine an overlapping area of the two frequently triggered right-hand tracks. In the end, the terminal determines the overlapping area of the two frequently triggered right-hand tracks as the frequently used touch area on the right side of the terminal.

Figure 18:
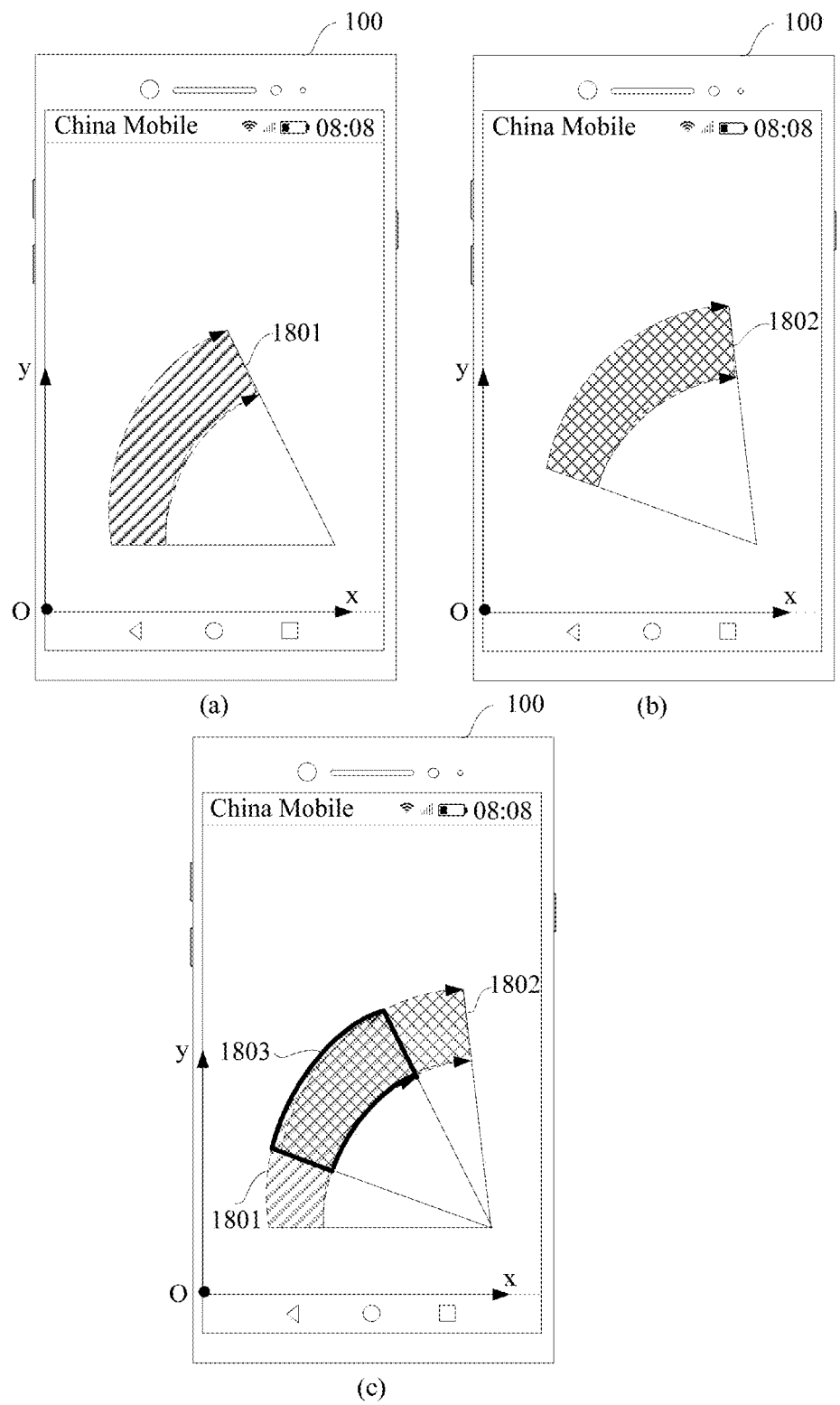
FIG. 18 is an example schematic diagram 1 of a sliding track according to this application.

For example, a sliding track 1801 shown in (a) in FIG. 18 and a sliding track 1802 shown in (b) in FIG. 18 are two frequently triggered right-hand tracks of the mobile phone 100. The terminal may determine an overlapping area 1803 of the sliding track 1801 and the sliding track 1802 shown in (c) in FIG. 18 as the frequently used touch area on the right side of the terminal.

Alternatively, the sliding track 1801 shown in (a) in FIG. 18 and the sliding track 1802 shown in (b) in FIG. 18 are still used as examples of two frequently triggered right-hand tracks of the mobile phone 100. The terminal can determine an intersection $D(x_3, y_3)$ of the sliding track 1801 and a straight line OC that passes through an origin O of a sector and a point $$C\left(\frac{x_2 - x_1}{2}, \frac{y_2 - y_1}{2}\right)$$

Figure 19:
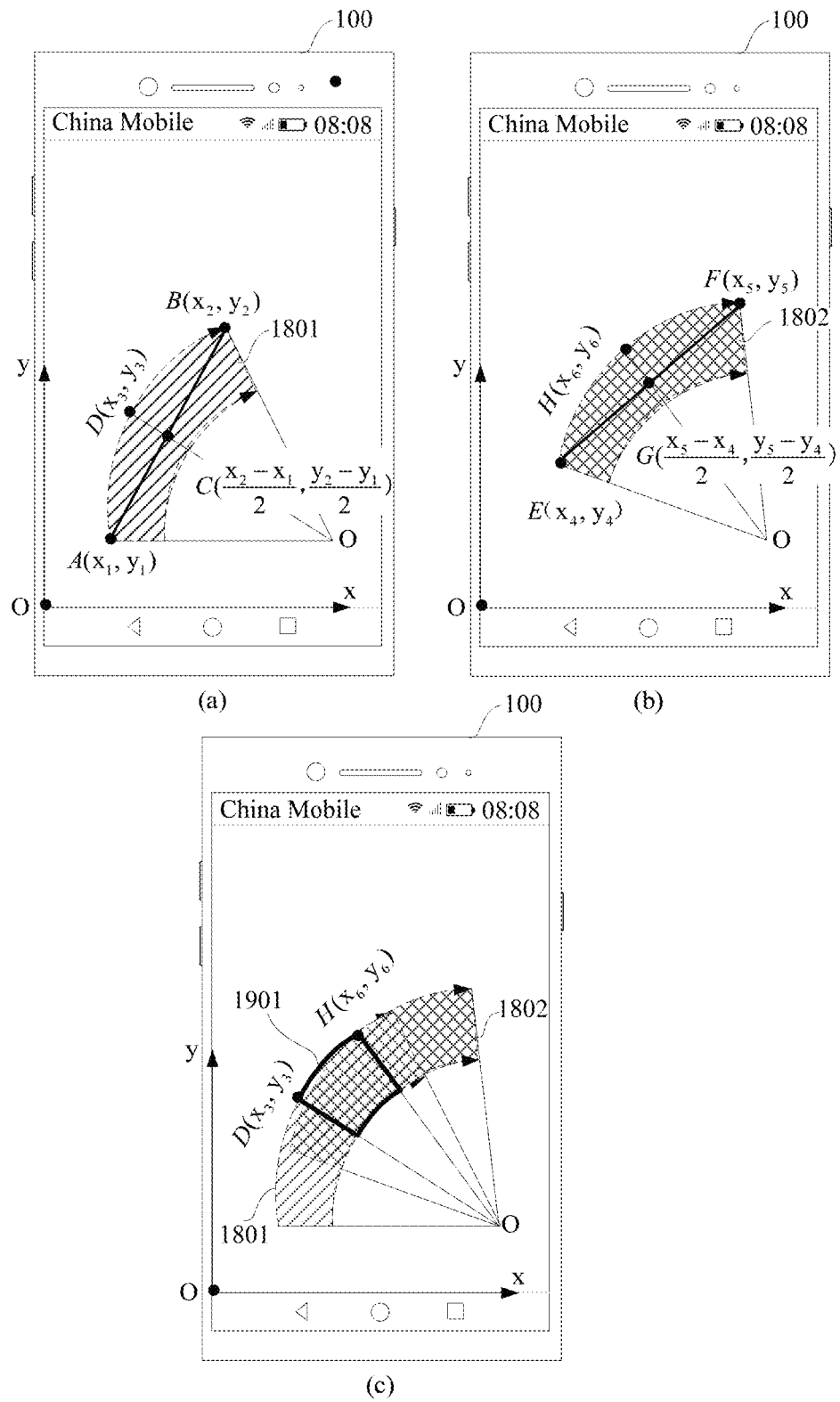
FIG. 19 is an example schematic diagram 2 of a sliding track according to this application.

(that is, a middle point of a line between a start point $A(x_1, y_1)$ and an end point $B(x_2, y_2)$ of the sliding track 1801) shown in (a) in FIG. 19, and determine an intersection $H(x_6, y_6)$ of the sliding track 1802 and a straight line OG that passes through an origin O of a sector and a point $$G\left(\frac{x_5 - x_4}{2}, \frac{y_5 - y_4}{2}\right)$$

(that is, a middle point of a line between a start point $E(x_4, y_4)$ and an end point $F(x_5, y_5)$ of the sliding track 1802) shown in (b) in FIG. 19. Then, as shown in (c) in FIG. 19, the terminal can determine an overlapping area 1901 that is of the sliding track 1801 and the sliding track 1802 and that is between the point $D(x_3, y_3)$ and the point $H(x_6, y_6)$, as the frequently used touch area on the right side of the terminal.

Figure 20:
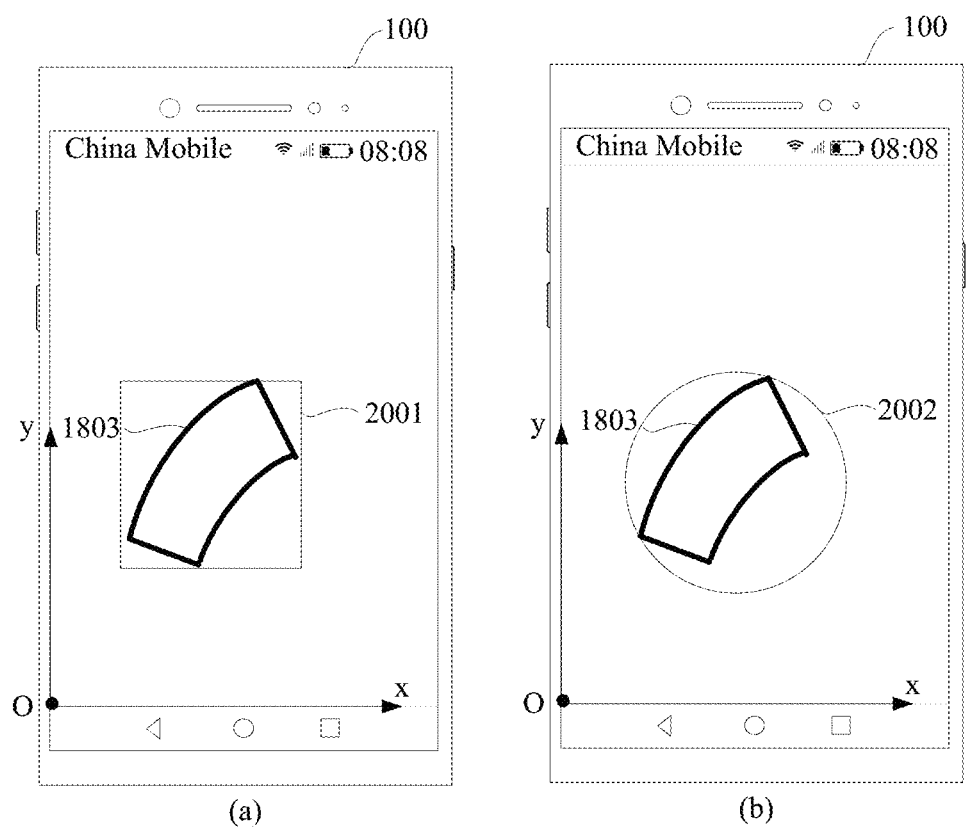
FIG. 20 is an example schematic diagram of a frequently used touch area according to this application.

The frequently used touch area in this application may alternatively be a fixedly-shaped display area including the overlapping area. For example, as shown in (a) in FIG. 20, the frequently used touch area may be a rectangular display area 2001 including the overlapping area 1803. Alternatively, as shown in (b) in FIG. 20, the frequently used touch area may be a circular display area 2002 including the overlapping area 1803.

According to the terminal interface display method provided in this application, the gesture input by the user on the touchscreen can be identified, to determine whether the user operates the mobile phone with the left hand or the right hand. This can avoid a problem of relatively high costs due to addition of an extra hardware device. In addition, in this application, when identifying that the user operates the terminal with a finger on the first side (such as the left hand or the right hand), the terminal can display, close to the first side of the terminal, a touch area that can be used for operating the terminal interface, so that the user can operate, on the touch area, all content on the terminal interface. In this way, the user is able to operate an area that is on the terminal interface and that is not reachable by the finger on the first side, without affecting the user's visual and operation experience.

Figure 21:
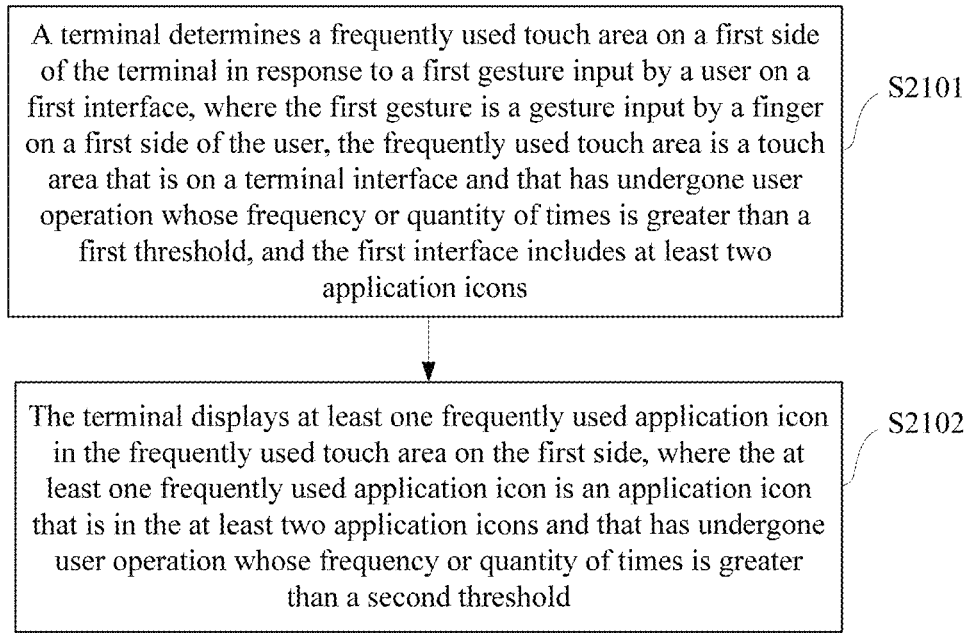
FIG. 21 is a flowchart 6 of a terminal interface display method according to this application.

This application provides a terminal interface display method. As shown in FIG. 21, the terminal interface display method includes S2101 to S2102.

S2101: A terminal determines a frequently used touch area on a first side of the terminal in response to a first gesture input by a user on a first interface, where the first gesture is a gesture input by a finger on a first side of the user, the frequently used touch area is a touch area that is on a terminal interface and that has undergone user operation whose frequency or quantity of times is greater than a first threshold, and the first interface includes at least two application icons.

For a method of "determining the frequently used touch area on the first side of the terminal by the terminal in response to the first gesture input by the user on the first interface" in S2101, refer to the detailed descriptions in S301 in this application. Details are not described herein again in this application.

S2102: The terminal displays at least one frequently used application icon in the frequently used touch area on the first side, where the at least one frequently used application icon is an application icon that is in the at least two application icons and that has undergone user operation whose frequency or quantity of times is greater than a second threshold.

Figure 22A:
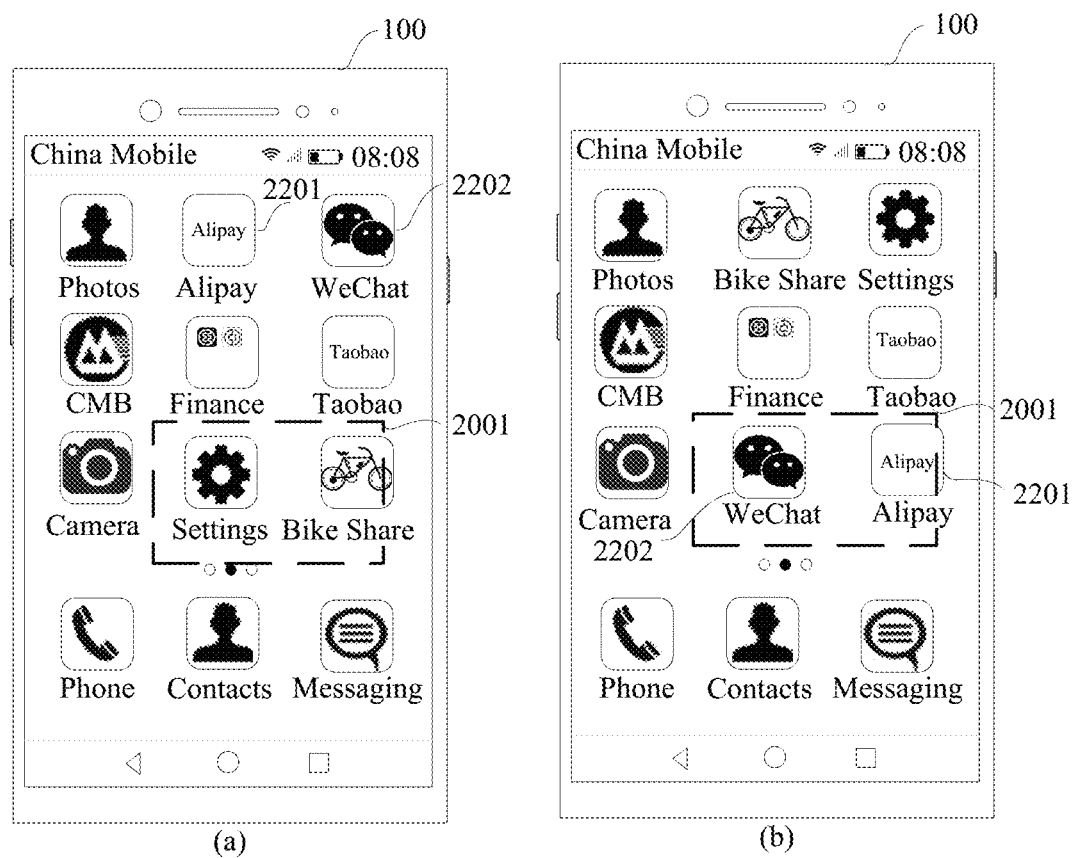
FIG. 22A is an example schematic diagram 9 of a terminal interface of a mobile phone according to this application.

For example, it is assumed that an "Alipay" application icon 2201 and a "WeChat" application icon 2202 shown in (a) in FIG. 22A are frequently used application icons of a mobile phone 100, that is, the "Alipay" application icon 2201 and the "WeChat" application icon 2202 are application icons that have undergone user operation whose quantity of times is greater than a preset threshold. In addition, a display area 2001 shown in (a) in FIG. 22A is the frequently used touch area on the first side. In this case, as shown in (b) in FIG. 22A, the mobile phone 100 may display the frequently used application icons, the "Alipay" application icon 2201 and the "WeChat" application icon 2202, in the frequently used touch area 2001.

This application provides the terminal interface display method. When the terminal determines that the user operates the terminal with the finger on the first side, the terminal may display the frequently used application icon in the terminal in the frequently used touch area on the first side, so that the user can operate the frequently used application icon more conveniently and comfortably, thereby improving user experience.

Further, when there are a relatively large quantity of frequently used application icons in the terminal, the frequently used touch area on the first side may be insufficient to display all the frequently used application icons.

In one embodiment, the terminal displays, in the frequently used touch area on the first side, top N frequently used application icons in descending order of frequency or quantity of times of user operation. N is a quantity of application icons that can be displayed in the frequently used touch area on the first side.

Figure 22B:
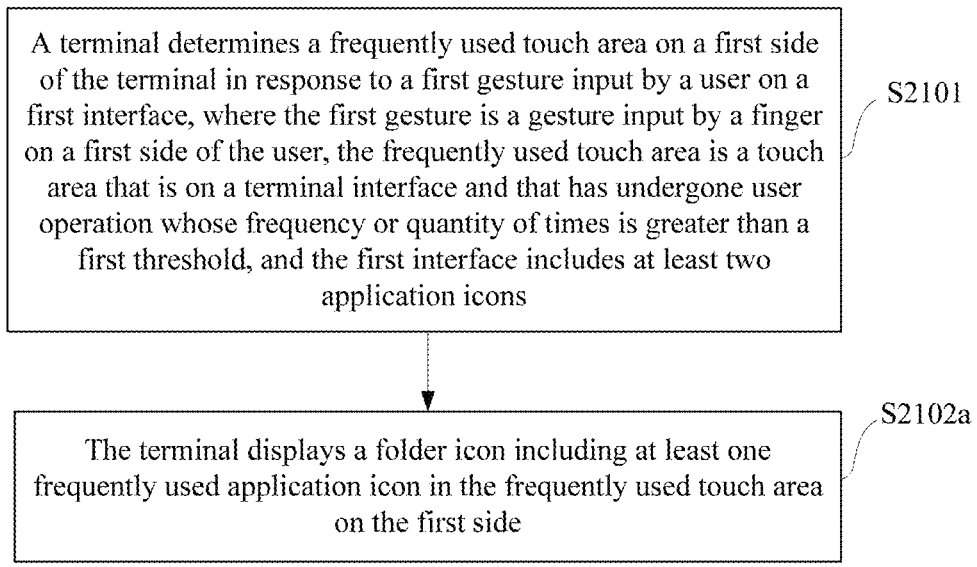
FIG. 22B is a flowchart 7 of a terminal interface display method according to this application.

In one embodiment, the terminal may further display, in the frequently used touch area on the first side, a folder icon including all the frequently used application icons. Specifically, as shown in FIG. 22B, S2102 in FIG. 21 may be replaced by S2102a.

S2102a: The terminal displays, in the frequently used touch area on the first side, a folder icon including at least one frequently used application icon.

Figure 22C:
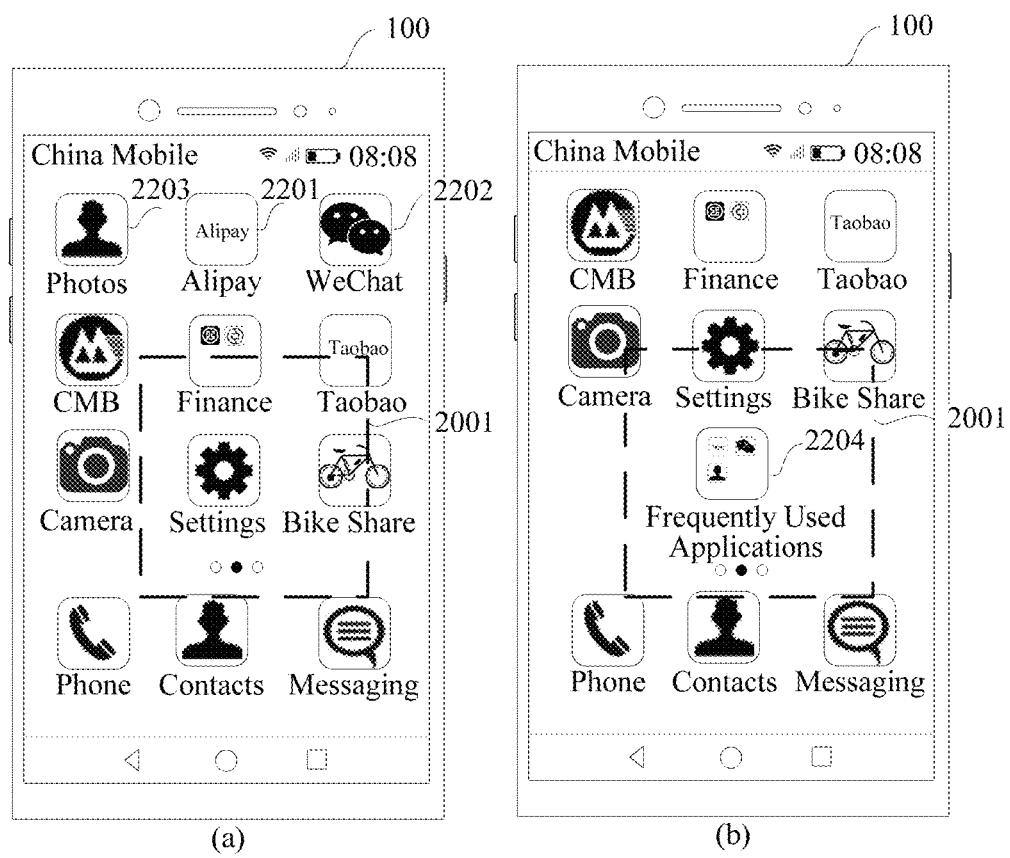
FIG. 22C is an example schematic diagram 10 of a terminal interface of a mobile phone according to this application.

For example, it is assumed that an "Alipay" application icon 2201, a "WeChat" application icon 2202, and a "Photos" application icon 2203 shown in (a) in FIG. 22C are frequently used application icons of a mobile phone 100, that is, the "Alipay" application icon 2201, the "WeChat" application icon 2202, and the "Photos" application icon 2203 are application icons that have undergone user operation whose quantity of times is greater than a preset threshold. In addition, a display area 2001 shown in (a) in FIG. 22C is the frequently used touch area on the first side. In this case, as shown in (b) in FIG. 22C, the mobile phone 100 may display, in the frequently used touch area 2001, a folder icon 2204 including the "Alipay" application icon 2201, the "WeChat" application icon 2202, and the "Photos" application icon 2203.

In one embodiment, the terminal may display, in the frequently used touch area on the first side, a folder icon including all the frequently used application icons. In this way, a problem that there are a relatively large quantity of frequently used application icons in the terminal but the frequently used touch area on the first side is insufficient to display all the frequently used application icons can be resolved. In addition, displaying, in the frequently used touch area on the first side, the folder icon including all the frequently used application icons can help the user operate all the frequently used application icons in the terminal.

Further, after S2102a, the method in this application may further include S2102b: The terminal displays, in the frequently used touch area on the first side in response to a user input specific to the folder icon, a folder expanded window corresponding to the folder icon, where the folder expanded window displays the at least one frequently used application icon.

Figure 22D:
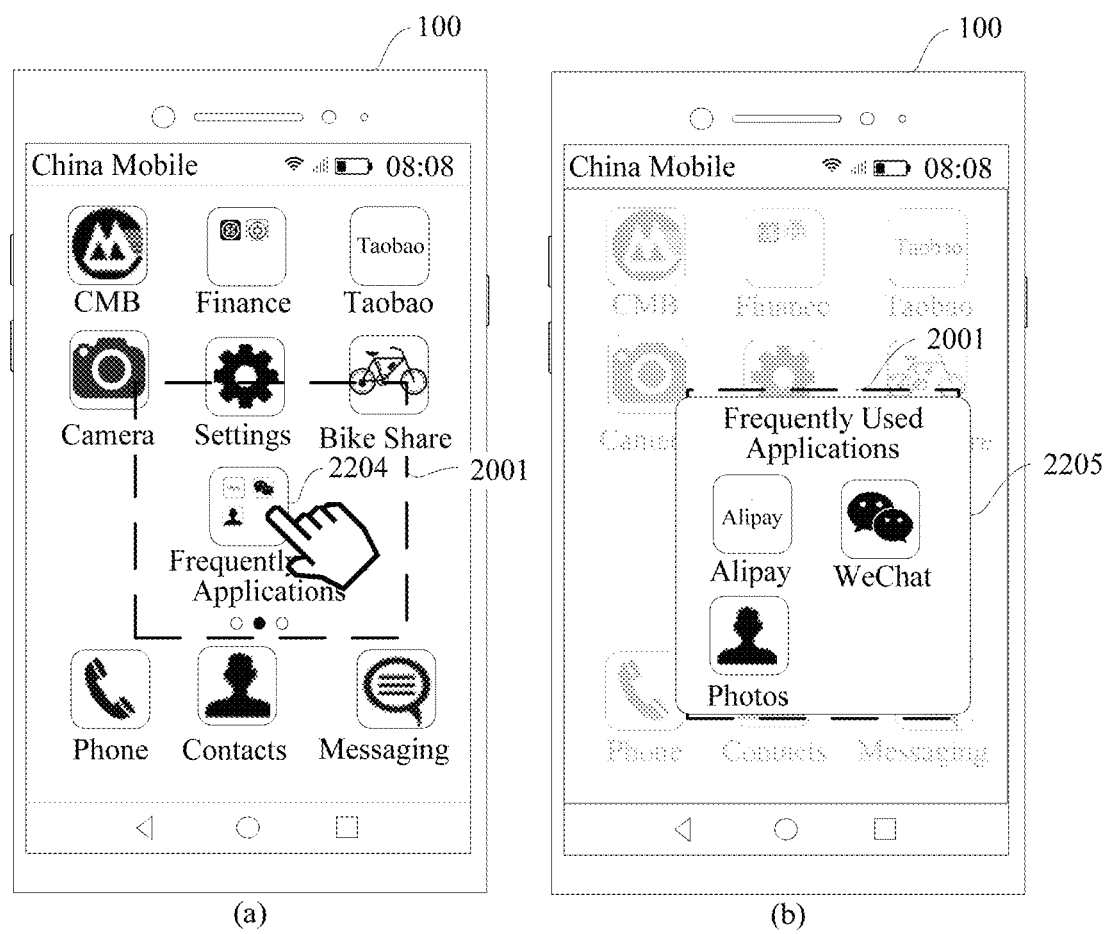
FIG. 22D is an example schematic diagram 11 of a terminal interface of a mobile phone according to this application.

For example, when the user touches the folder icon 2204 shown in (a) in FIG. 22D, the mobile phone 100 can display, in the right frequently used touch area 2001 in response to the touch operation of the user on the folder icon 2204, a folder expanded window 2205 corresponding to the folder icon 2204. As shown in (b) in FIG. 22D, the folder expanded window 2205 includes the "Alipay" application icon 2201, the "WeChat" application icon 2202, and the "Photos" application icon.

In one embodiment, the terminal may further display, in the frequently used touch area on the first side in response to the user input specific to the folder icon including the frequently used application icons, the folder expanded window corresponding to the folder icon. This can help the user operate all the frequently used application icons in the terminal.

Figure 23:
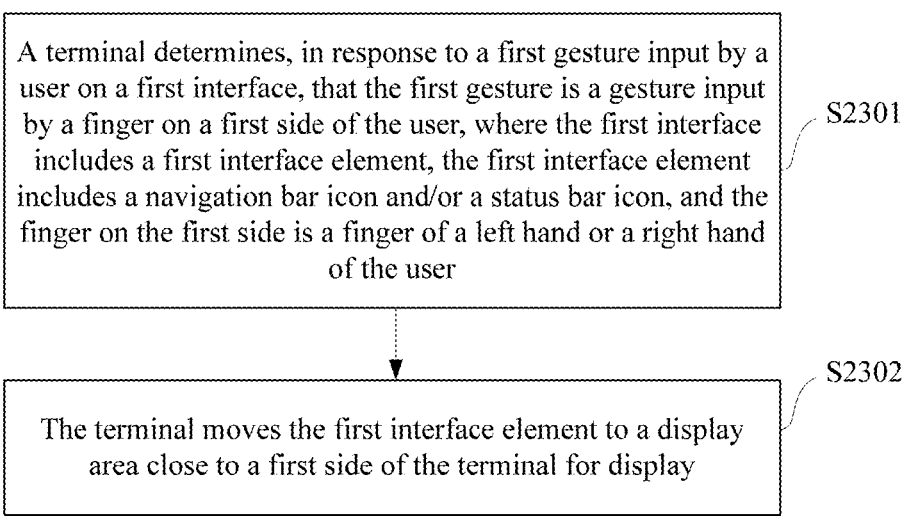
FIG. 23 is a flowchart 8 of a terminal interface display method according to this application.

This application provides a terminal interface display method. As shown in FIG. 23, the terminal interface display method includes S2301 to S2302.

S2301: A terminal determines, in response to a first gesture input by a user on a first interface, that the first gesture is a gesture input by a finger on a first side of the user, where the first interface includes a first interface element, the first interface element includes a navigation bar icon and/or a dock bar icon, and the finger on the first side is a finger of a left hand or a right hand of the user.

For a method of "determining, by the terminal in response to the first gesture input by the user on the first interface, that the first gesture is a gesture input by the finger on the first side of the user" in S2301, refer to the detailed descriptions in S301 in this application. Details are not described herein again in this application.

A navigation bar (Navigation Bar) in this application is a shortcut key bar at the bottom of a touchscreen of a mobile phone, and usually appears in a form of a virtual key at the bottom of the touchscreen of the mobile phone. By default, the navigation bar includes three keys: a Back key, a Home key, and a Recent (Recent) key, where the Back key is used to return to a previous interface, the Home key is used to return to a desktop, and the Recent key is used to display a recently used application. As shown in (b) in FIG. 24, a navigation bar 2402 includes a Back key 2403, a Home key 2404, and a Recent key 2405.

A dock bar (Dock Bar) in this application is a part of an entire window that fills a touchscreen of a mobile phone or an interactive interface (Activity, that is, an application area for displaying an application icon) that is suspended on another window. Visually, the dock bar is located below the Activity and is located above the navigation bar. The dock bar and the navigation bar are at two window layers, and the dock bar is located at a lower layer of the navigation bar.

Figure 24:
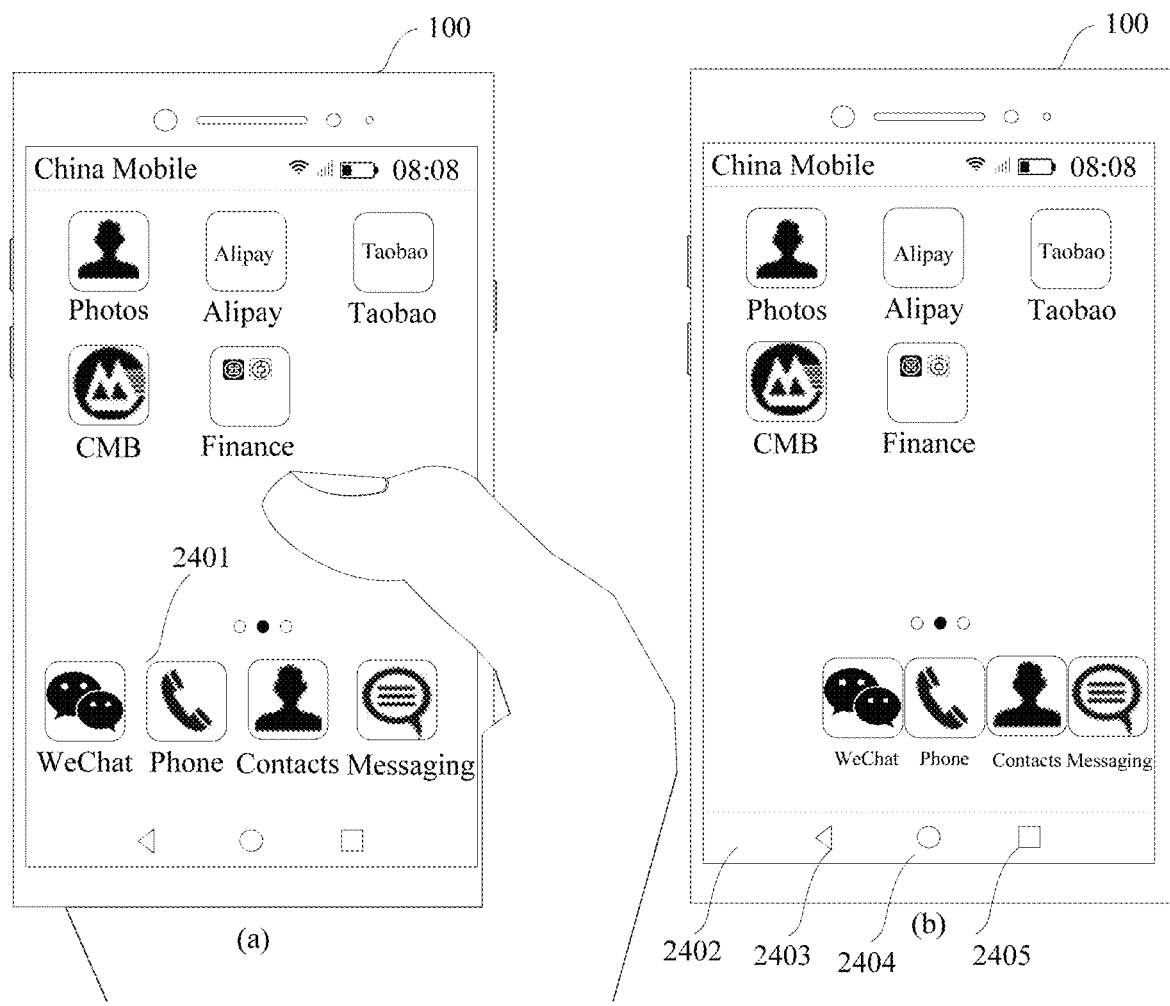
FIG. 24 is an example schematic diagram 12 of a terminal interface of a mobile phone according to this application.

As shown in (a) in FIG. 24, a dock bar 2401 of the mobile phone 100 includes the following dock bar icons: a "WeChat" application icon, a "Phone" icon, a "Contacts" icon, and a "Messaging" icon.

S2302: The terminal moves the first interface element to a display area close to a first side of the terminal for display.

For example, as shown in (a) in FIG. 24, when the user operates the mobile phone 100 with the right hand, the mobile phone 100 can determine that the user-input gesture is a gesture input by a finger of the right hand of the user. Then, the mobile phone 100 can move the first interface element (such as the dock bar icons) to a display area close to a right side of the terminal for display. That is, a display interface shown in (b) in FIG. 24 is displayed.

Figure 25:
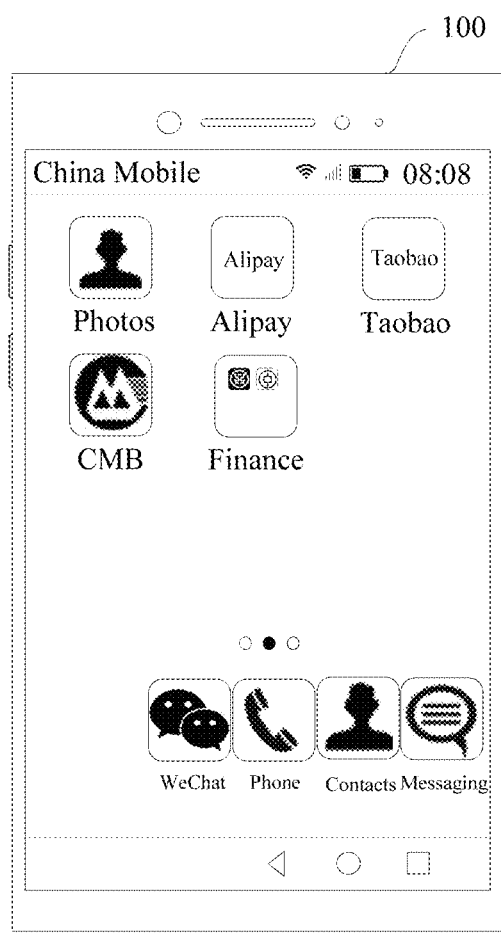
FIG. 25 is an example schematic diagram 13 of a terminal interface of a mobile phone according to this application.

Alternatively, the first interface element may include a dock bar icon and a navigation bar icon. In this case, as shown in (a) in FIG. 24, when the user operates the mobile phone 100 with the right hand, the mobile phone 100 can determine that the user-input gesture is a gesture input by a finger of the right hand of the user. Then, the mobile phone 100 can move the dock bar icons and navigation bar icons to a display area close to a right side of the terminal for display. That is, a display interface shown in FIG. 25 is displayed.

This application provides the terminal interface display method. When the terminal determines that the user operates the terminal with the finger on the first side, the terminal can move the dock bar icon and/or the navigation bar icon on a terminal interface to the display area close to the first side of the terminal for display, so that the user can operate the dock bar icon and/or the navigation bar icon more conveniently and comfortably, thereby improving user experience.

It can be understood that during use of the terminal by the user, the terminal may display a prompt window, a pop-up key, a floating key, and the like. Generally, the terminal may display the prompt window, the pop-up key, the floating key, and the like in the middle of the terminal interface. However, displaying the keys or window in the middle of the terminal interface may not be convenient for the user to operate. To help the user operate these keys or window, the terminal in this application may display, after determining that the user operates the terminal by using the finger on the first side, a to-be-displayed key or window in a display area close to the first side of the terminal. Alternatively, the terminal may alternatively display, after determining that the user operates the terminal by using the finger on the first side, a to-be-displayed key or window in a frequently used touch area on the first side.

Figure 26:
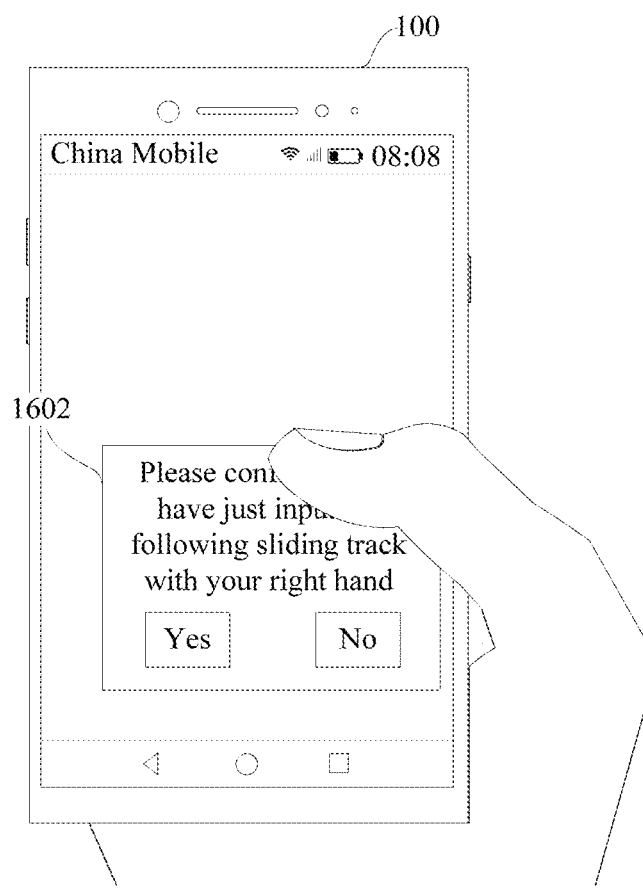
FIG. 26 is an example schematic diagram 14 of a terminal interface of a mobile phone according to this application.

For example, a prompt window 1602 shown in (b) in 16 is used as an example. When the mobile phone 100 determines that the user operates the terminal with the right hand, the mobile phone 100 can display a display interface shown in FIG. 26. On the display interface shown in FIG. 26, the prompt window 1602 is displayed close to the bottom right of the mobile phone 100.

Further, when the user holds the terminal with a hand, an unintentional touch on the touchscreen may be caused because a plurality of fingers of the user are in contact with the touchscreen of the terminal at the same time.

Figure 27A:
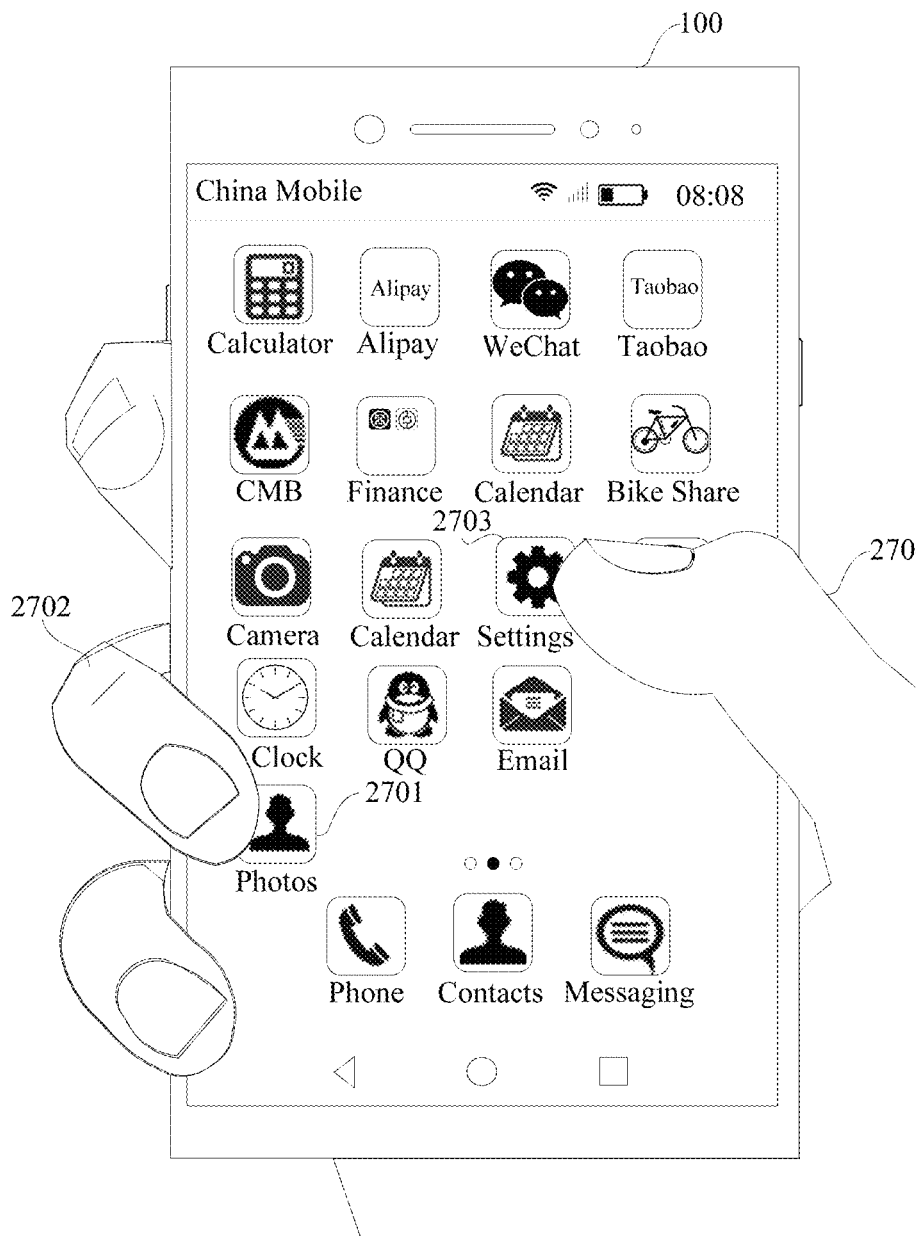
FIG. 27($a$) and FIG. 27($b$) are an example schematic diagram 15 of a terminal interface of a mobile phone according to this application.
Figure 27B:
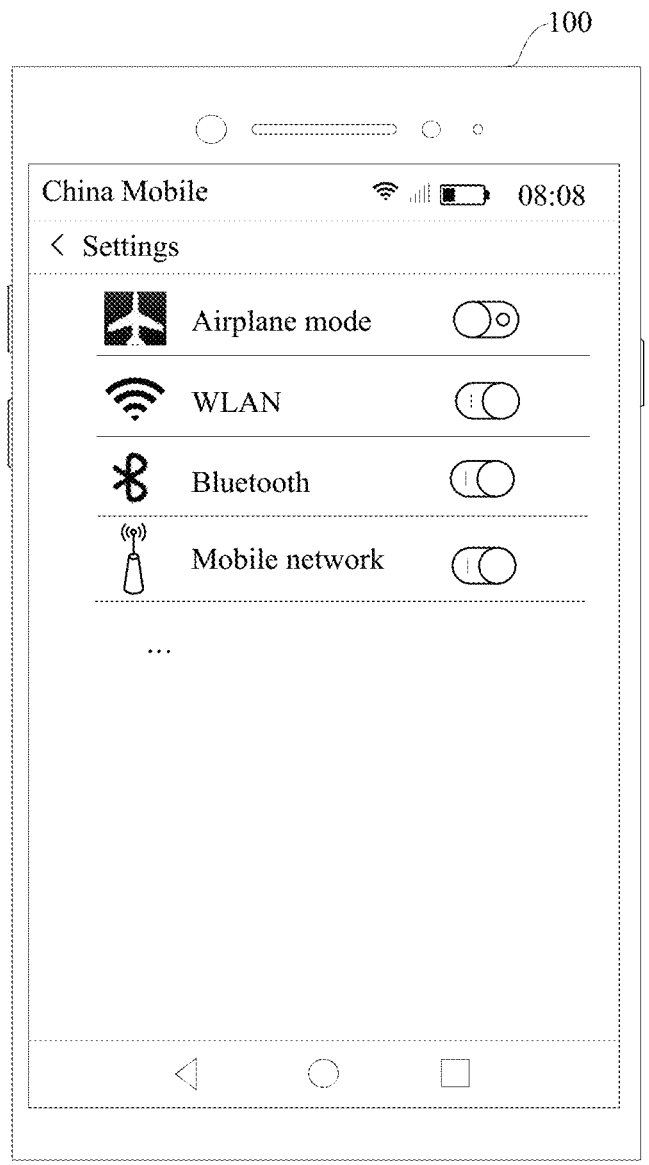

For example, as shown in FIG. 27(a), the user holds the mobile phone 100 with the right hand. When a thumb 2704 of the user touches a "Settings" icon 2703 on the touchscreen to control the mobile phone 100 to display a settings interface, a ring finger 2702 of the right hand of the user may come into contact with a "Photos" icon 2701 on the touchscreen. That is, the ring finger of the right hand of the user unintentionally touches the touchscreen of the mobile phone 100. In this case, with the method in this application, the terminal can identify that the user operates the mobile phone with the right hand. If the terminal detects a user input specific to an icon on a left side (an icon that is on the touchscreen and that is close to the left side of the mobile phone) and a user input specific to an icon on a right side (an icon that is on the touchscreen and that is close to the right side of the mobile phone) at the same time, the terminal can ignore or screen the user input specific to the icon on the left side, and respond only to the user input specific to the icon on the right side. For example, the mobile phone 100 can ignore the unintentional touch of the ring finger of the right hand of the user on the "Photos" icon 2701, and respond only to the touch operation of the thumb 2704 of the user on the "Settings" icon 2703, to display a settings interface shown in FIG. 27(b).

Figure 28A:
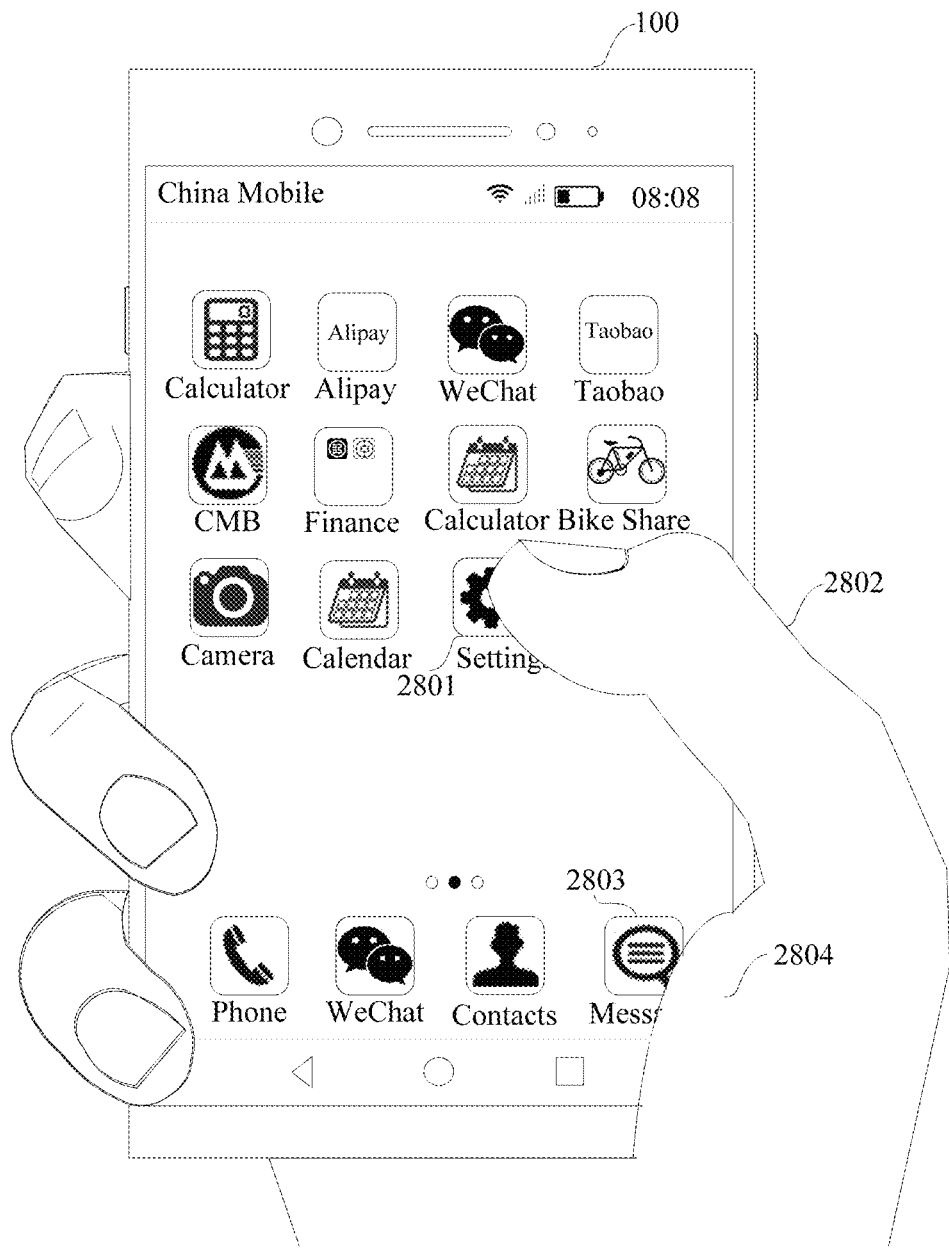
FIG. 28($a$) and FIG. 28($b$) are an example schematic diagram 16 of a terminal interface of a mobile phone according to this application.
Figure 28B:
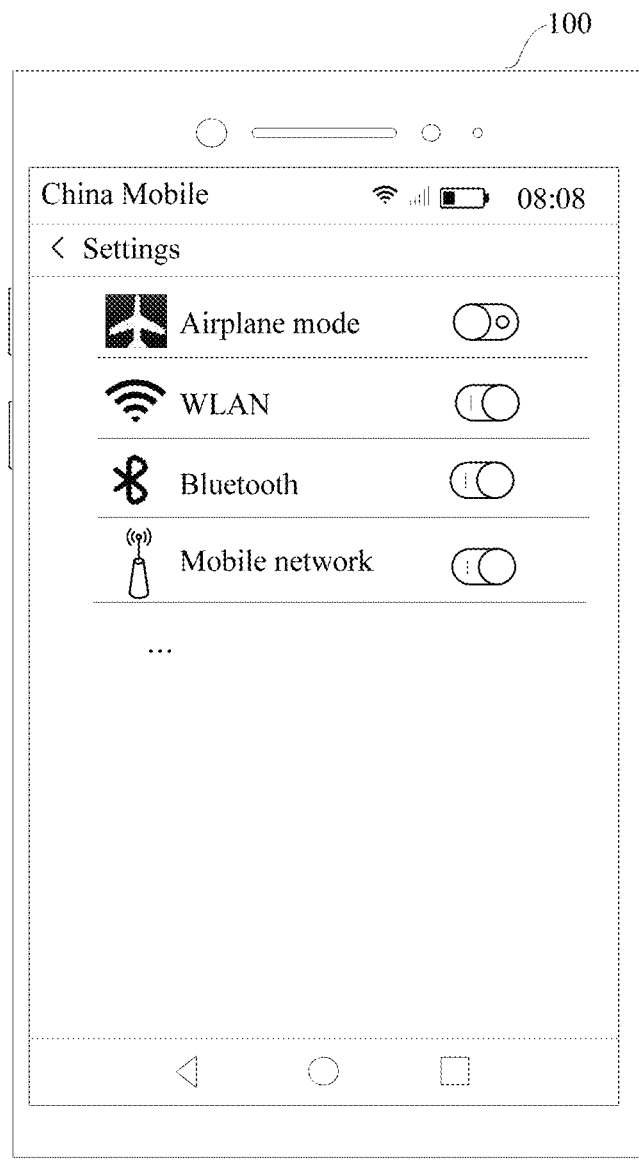

For another example, as shown in FIG. 28(a), the user holds the mobile phone 100 with the right hand. When a thumb 2802 of the user touches a "Settings" icon 2801 on the touchscreen to control the mobile phone 100 to display a settings interface, a root 2804 of the thumb 2802 may come into contact with a "Messaging" icon 2803 on the touchscreen. That is, the root 2804 of the thumb 2802 unintentionally touches the touchscreen of the mobile phone 100. In this case, with the method in this application, the terminal can identify that the user operates the mobile phone with the right hand. If the terminal detects a user input specific to an upper half area of an Activity (that is, an area in the Activity except for a Launcher) of the touchscreen and a user input specific to the Launcher or the navigation bar, the terminal can ignore or screen the user input specific to the Launcher or the navigation bar, and respond only to the user input specific to the upper half area of the Activity. For example, the mobile phone 100 can ignore the unintentional touch of the root 2804 of the thumb 2802 on the "Messaging" icon 2803, and respond only to the touch operation of the thumb 2802 of the user on the "Settings" icon 2801, to display a settings interface shown in FIG. 28(b).

The terminal in this application may prestore a left-hand unintentional touch model and a right-hand unintentional touch model. The left-hand unintentional touch model includes at least one left-hand unintentional touch prevention rule. The left-hand unintentional touch prevention rule is used to indicate how the terminal shall selectively respond to at least two inputs of the user in different areas of the touchscreen when the user holds the mobile phone with the left hand and the terminal detects the at least two inputs at the same time. Likewise, the right-hand unintentional touch model includes at least one right-hand unintentional touch prevention rule. The right-hand unintentional touch prevention rule is used to indicate how the terminal shall selectively respond to at least two inputs of the user in different areas of the touchscreen when the user holds the mobile phone with the right hand and the terminal detects the at least two inputs at the same time.

According to the terminal interface display method provided in this application, when the terminal determines that the user operates the terminal with a finger on the first side (the left hand or the right hand), if the terminal detects at least two inputs of the user in different areas of the touchscreen at the same time, the terminal can selectively respond to the at least two inputs according to an instruction of an unintentional touch prevention rule in a first-side unintentional touch model (that is, the left-hand unintentional touch model or the right-hand unintentional touch model), so as to prevent the terminal from responding to an unintentional touch of the user on the touchscreen and displaying a terminal interface not corresponding to the user operation.

It can be understood that the terminal and the like include a corresponding hardware structure and/or software module for performing each function, to implement the foregoing function. A person skilled in the art should be easily aware that, in the embodiments of the present invention, the units and algorithm operations in the examples described with reference to the embodiments disclosed in this specification can be implemented by hardware or a combination of hardware and computer software. Whether a function is performed by hardware or hardware driven by computer software depends on particular applications and design constraints of the technical solutions. A person skilled in the art may use a different method to implement the described functions for each particular application, but it should not be considered that the implementation goes beyond the scope of the embodiments of the present invention.

In the embodiments of this application, functional-module division may be performed on the terminal and the like based on the examples of the foregoing method. For example, functional modules obtained through division may be in one-to-one correspondence with functions, or two or more functions may be integrated into one processing module. The integrated module may be implemented in a form of hardware, or may be implemented in a form of a software functional module. It should be noted that the module division in the embodiments of the present invention is an example. The module division is merely logical function division and may be other division in actual implementation.

Figure 29:
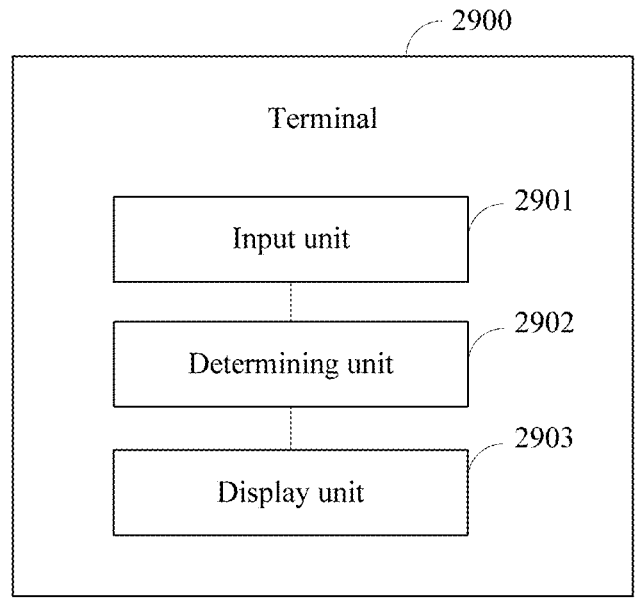
FIG. 29 is a schematic structural composition diagram 1 of a terminal according to this application.

In a case in which functional modules obtained through division are in one-to-one correspondence with functions, FIG. 29 shows a schematic structural diagram of a terminal in the foregoing embodiments. The terminal 2900 includes an input unit 2901, a determining unit 2902, and a display unit 2903.

The input unit 2901 is configured to support the terminal in implementing the receiving a first gesture described in S301, S301a, S2101, and S2301; the receiving a second gesture described in S303; the receiving a third gesture described in S1402 and S1602; the receiving a first input described in S1603; and S2302 in the foregoing method embodiments, and/or another process of the technique described herein. The determining unit 2902 is configured to support the terminal in implementing the determining a frequently used touch area described in S301, S301b, S2101, and S2301; the determining that the first gesture is a gesture input by a finger on a first side of the user in S301a and S1602; S901, S902, S1101, S1103, S1301, and S1701 in the foregoing method embodiments, and/or another process of the technique described herein. The display unit 2903 is configured to support the terminal in implementing the displaying a first interface in S301 and S301a; S302; the displaying a second interface in S303; S1401; S1601; the displaying a fourth interface in S1602; S2102; and S2102a in the method embodiments, and/or another process of the technique described herein.

Further, the terminal 2900 may further include a statistics collection unit and a storage unit. The statistics collection unit is configured to support the terminal in implementing the collecting statistics on coordinates of a sliding track in S1402, and S1604 in the method embodiments, and/or another process of the technique described herein. The storage unit is configured to support the terminal in implementing S1403 and S1605 in the method embodiments, and/or another process of the technique described herein.

For function descriptions of the corresponding functional modules, refer to all related content of the operations in the foregoing method embodiments. Details are not described herein again.

Certainly, the terminal 2900 includes, but is not limited to the foregoing enumerated unit modules. For example, the terminal 2900 may further include a communications unit, where the communications unit is configured to communicate with another terminal. In addition, functions that the functional units can specifically implement include but are not limited to the functions corresponding to the method operations in the foregoing embodiments. For detailed descriptions of other units of the terminal 2900, refer to the detailed descriptions of the method operations corresponding to the other units. Details are not described herein again in this embodiment of this application.

When an integrated unit is used, the determining unit 2902 and the statistics collection unit may be integrated in one processing module for implementation. The communications unit may be an RF circuit of the terminal, a Wi-Fi module, or a Bluetooth module. The storage unit may be a storage module of the terminal. The display unit may be a display module such as a touchscreen.

Figure 30:
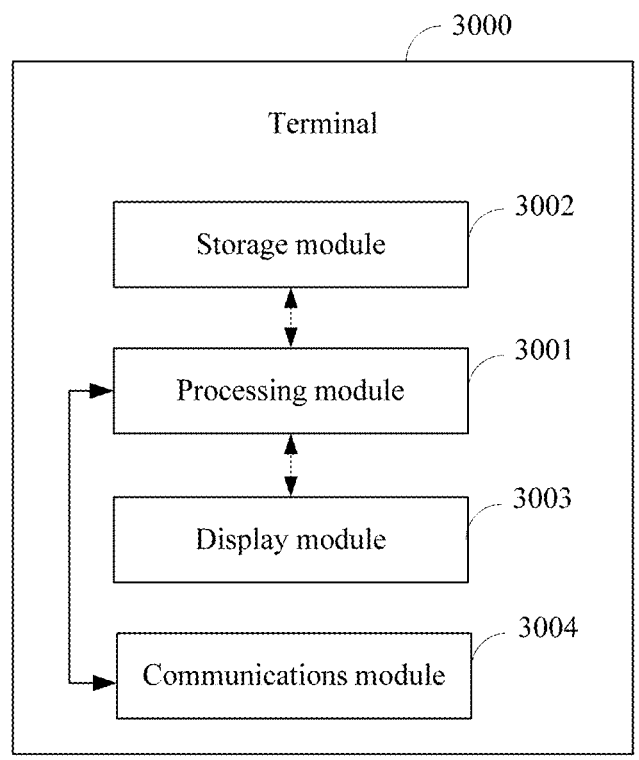
FIG. 30 is a schematic structural composition diagram 2 of a terminal according to this application.

FIG. 30 shows a schematic structural diagram of a terminal in the foregoing embodiments. The terminal 3000 includes a processing module 3001, a storage module 3002, a display module 3003, and a communications module 3004. The processing module 3001 is configured to perform control management on an action of the terminal. The display module 3003 is configured to display an image generated by the processing module 3001. The storage module 3002 is configured to store program code and data of the terminal. The communications module 3004 is configured to communicate with another terminal. For example, the communications module 3004 is configured to perform voice communication with another terminal, and receive a head portrait from or send a head portrait to another terminal.

The processing module 3001 may be a processor or a controller, for example, a central processing unit (Central Processing Unit, CPU), a general-purpose processor, a digital signal processor (Digital Signal Processing, DSP), an application-specific integrated circuit (Application-Specific Integrated Circuit, ASIC), a field programmable gate array (Field Programmable Gate Array, FPGA), or another programmable logic device, a transistor logic device, a hardware component, or a combination thereof. The processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The communications module 3004 may be a transceiver, a transceiver circuit, a communications interface, or the like. The storage module 3002 may be a memory.

When the processing module 3001 is a processor (such as the processor 101 shown in FIG. 2), the communications module 3004 is an RF circuit (such as the radio frequency circuit 102 shown in FIG. 2), the storage module 3002 is a memory (such as the memory 103 shown in FIG. 2), and the display module 3003 is a touchscreen (including the touchpad 104-1 and the display 104-2 shown in FIG. 2), the terminal provided in this application may be the mobile phone 100 shown in FIG. 2. The communications module 3004 may not only include the RF circuit, but also include a Wi-Fi module and a Bluetooth module. A communications module such as an RF circuit, a Wi-Fi module, and a Bluetooth module may be collectively referred to as a communications interface. The processor, the communications interface, the touchscreen, and the memory may be coupled together by using a bus.

Referring to any one of FIG. 4, FIG. 6A, FIG. 6B, FIG. 8, and FIG. 15, an embodiment of this application further provides a graphical user interface (GUI). The graphical user interface is stored in a terminal, and the terminal includes a touchscreen, a memory, a processor, and a communications interface. The processor is configured to execute one or more computer programs stored in the memory, and the graphical user interface includes: a first GUI; a second GUI displayed in response to a first gesture input on the first GUI, where a frequently used touch area on a first side of the second GUI includes a first touch panel, the first touch panel is used for operating the first GUI in response to a gesture input by the user, the first gesture is a gesture input by a finger on a first side of the user, and the frequently used touch area is a touch area that is on the second GUI and that has undergone user operation whose frequency or quantity of times is greater than a first threshold; and a third GUI displayed in response to a second gesture input on the first touch panel on the second GUI, where the third GUI includes an interface element displayed by the terminal in response to a third gesture input by the user in a corresponding position on the first GUI.

Further, referring to FIG. 16, the GUI further includes a fourth GUI, where the fourth GUI includes first prompt information, and the first prompt information is used to prompt the user to slide on the fourth GUI with the finger on the first side.

Referring to FIG. 22A, an embodiment of this application further provides a graphical user interface (GUI). The graphical user interface is stored in a terminal, and the terminal includes a touchscreen, a memory, a processor, and a communications interface. The processor is configured to execute one or more computer programs stored in the memory. The graphical user interface is stored in a terminal, and the terminal includes a touchscreen, a memory, a processor, and a communications interface. The processor is configured to execute one or more computer programs stored in the memory, and the graphical user interface includes: a first GUI, where the first GUI includes at least two application icons; and a second GUI displayed in response to a first gesture input on the first GUI, where a frequently used touch area on a first side of the second GUI includes at least one frequently used application icon, the first gesture is a gesture input by a finger on a first side of a user, the frequently used touch area is a touch area that is on the second GUI and that has undergone user operation whose frequency or quantity of times is greater than a first threshold, and the at least one frequently used application icon is an application icon that is in the at least two application icons and that has undergone user operation whose frequency or quantity of times is greater than a second threshold.

Further, referring to FIG. 22C, the second GUI includes a folder icon, and the folder icon includes the at least one frequently used application icon.

Further, referring to FIG. 22D, the GUI further includes a third GUI displayed in response to an input specific to the folder icon on the second GUI, where the third GUI includes a folder expanded window corresponding to the folder icon, and the folder expanded window displays the at least one frequently used application icon.

Referring to FIG. 24 or FIG. 25, an embodiment of this application further provides a graphical user interface (GUI). The graphical user interface is stored in a terminal, and the terminal includes a touchscreen, a memory, a processor, and a communications interface. The processor is configured to execute one or more computer programs stored in the memory. The graphical user interface is stored in a terminal, and the terminal includes a touchscreen, a memory, a processor, and a communications interface. The processor is configured to execute one or more computer programs stored in the memory, and the graphical user interface includes: a first GUI, where the first GUI includes a first interface element, and the first interface element includes a navigation bar icon and/or a dock bar icon; and a second GUI displayed in response to a first gesture input on the first GUI, where a display area on a first side of the second GUI includes the first interface element.

This application further provides a computer storage medium. The computer storage medium stores computer program code. When the processor executes the computer program code, the terminal performs the related method operations in any one of FIG. 3, FIG. 9, FIG. 11, FIG. 14, FIG. 17, FIG. 21, FIG. 22B, and FIG. 23, to implement the terminal interface display method in the foregoing embodiment.

This application further provides a computer program product. When the computer program product is run on a computer, the computer is enabled to perform the related method operations in any one of FIG. 3, FIG. 9, FIG. 11, FIG. 14, FIG. 17, FIG. 21, FIG. 22B, and FIG. 23, to implement the terminal interface display method in the foregoing embodiment.

The terminal 2900, the terminal 3000, the computer storage medium, and the computer program product provided in this application are all configured to implement the corresponding methods provided in the foregoing. Therefore, for beneficial effects achieved by the terminal 2900, the terminal 3000, the computer storage medium, and the computer program product, refer to the beneficial effects of the corresponding methods provided in the foregoing. Details are not described herein again.

The foregoing descriptions of implementations allow a person skilled in the art to clearly understand that, for convenient and brief description, only division into the foregoing functional modules is used as an example for description. In actual application, the foregoing functions can be allocated to different modules for implementation according to a requirement. That is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the module or unit division is merely logical function division and may be other division in actual implementation. For example, a plurality of units or components may be combined or integrated into another system, or some features may be ignored or may be not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate. Parts displayed as units may or may not be physical units, and may be located in one position or distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The software product is stored in a storage medium, and includes several instructions for instructing a computer device (which may be a personal computer, a server, a network device, or the like) or a processor to perform all or some of the operations of the methods described in the embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A terminal interface display method, comprising:
   determining, by a terminal, a frequently used touch area on a first side of the terminal in response to a first gesture by a user on a first interface, wherein the first gesture is a gesture input by a finger on the first side of the user, and wherein the frequently used touch area is a touch area that is on a terminal interface of the terminal and that has undergone a user operation whose frequency or quantity of times is greater than a first threshold, wherein the determining of the frequently used touch area on the first side of the terminal further comprises calculating a tangent value of an angle between an x-axis or a y-axis of a coordinate axis and a line between a start point and an end point of a sliding track of the first gesture, and determining the frequently used touch area on the first side when the tangent value is in a value interval corresponding to the first side of the terminal and a preset proportion of points on the sliding track of the first gesture are close to the first side of the terminal;
   displaying, by the terminal, a first touch panel in the frequently used touch area on the first side, wherein the first touch panel is to operate the first interface; and
   displaying, by the terminal, a second interface in response to a second gesture input by the user on the first touch panel, wherein the second interface comprises an operable interface element displayed by the terminal in response to a third gesture input by the user in a corresponding position on the first interface;
   wherein when the finger on the first side is a finger of a left hand, the first side of the terminal is a left side of the terminal, when the finger on the first side is a finger of a right hand, the first side of the terminal is a right side of the terminal.

2. The terminal interface display method according to claim 1, wherein the first touch panel is a blank touch panel with touch points that are in a one-to-one mapping with touch points in corresponding positions on the first interface.

3. The terminal interface display method according to claim 2, wherein a touching of the blank touch panel at a touch point is to cause the terminal to display a cursor at a corresponding touch point on the first interface.

4. A terminal, comprising:
   at least one processor; and
   a memory coupled to the at least one processor and configured to store programming instructions that, when executed by the at least one processor, cause the terminal to perform operations comprising:
   determining a frequently used touch area on a first side of the terminal in response to a first gesture by a user on a first interface, wherein the first gesture is a gesture input by a finger on the first side of the user, and wherein the frequently used touch area is a touch area that is on a terminal interface and that has undergone a user operation whose frequency or quantity of times is greater than a first threshold, wherein the determining of the frequently used touch area on the first side of the terminal comprises calculating a tangent value of an angle between an x-axis or a y-axis of a coordinate axis and a line between a start point and an end point of a sliding track of the first gesture, and determining the frequently used touch area on the first side when the tangent value is in a value interval corresponding to the first side of the terminal and a preset proportion of points on the sliding track of the first gesture are close to the first side of the terminal;
   displaying a first touch panel in the frequently used touch area on the first side, wherein the first touch panel is to operate the first interface; and
   displaying a second interface in response to a second gesture input by the user on the first touch panel, wherein the second interface comprises an interface element displayed by the terminal in response to a third gesture input by the user in a corresponding position on the first interface, wherein
   when the finger on the first side is a finger of a left hand, the first side of the terminal is a left side of the terminal; or when the finger on the first side is a finger of a right hand, the first side of the terminal is a right side of the terminal.

5. The terminal according to claim 4, wherein the first touch panel is a blank touch panel with touch points that are in a one-to-one mapping with touch points in corresponding positions on the first interface.

6. The terminal according to claim 5, wherein a touching of the blank touch panel at a touch point is to cause the terminal to display a cursor at a corresponding touch point on the first interface.

7. A non-transitory computer-readable medium having processor-executable instructions stored thereon, wherein the processor-executable instructions, when executed, perform operations comprising:

determining a frequently used touch area on a first side of a terminal in response to a first gesture by a user on a first interface, wherein the first gesture is a gesture input by a finger on the first side of the user, and the frequently used touch area is a touch area that is on a terminal interface and that has undergone a user operation whose frequency or quantity of times is greater than a first threshold, wherein the determining of the frequently used touch area on the first side of the terminal comprises determining the frequently used touch area on the first side of the terminal based on coordinates of at least one first-side finger sliding track in a first-side track model, wherein the first-side track model is a left-hand track model or a right-hand track model, the right-hand track model comprises coordinates of at least one right-hand sliding track, and the left-hand track model comprises coordinates of at least one left-hand sliding track;

displaying a first touch panel in the frequently used touch area on the first side, wherein the first touch panel is to operate the first interface; and displaying a second interface in response to a second gesture input by the user on the first touch panel, wherein the second interface comprises an interface element displayed by the terminal in response to a third gesture input by the user in a corresponding position on the first interface, wherein when the finger on the first side is a finger of a left hand, the first side of the terminal is a left side of the terminal, when the finger on the first side is a finger of a right hand, the first side of the terminal is a right side of the terminal.

8. The non-transitory computer-readable medium of claim 7, wherein the first touch panel is a blank touch panel with touch points that are in a one-to-one mapping with touch points in corresponding positions on the first interface.

9. The non-transitory computer-readable medium of claim 8, wherein a touching of the blank touch panel at a touch point is to cause the terminal to display a cursor at a corresponding touch point on the first interface.

* * * * *